(12) United States Patent
Horiuchi et al.

(10) Patent No.: US 10,960,700 B2
(45) Date of Patent: Mar. 30, 2021

(54) SETTING APPARATUS, SHAPING SYSTEM, SETTING METHOD, AND COMPUTER-READABLE RECORDING MEDIUM

(71) Applicant: CASIO COMPUTER CO., LTD., Tokyo (JP)

(72) Inventors: Yuji Horiuchi, Higashiyamato (JP); Kenji Iwamoto, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/718,145

(22) Filed: Dec. 17, 2019

(65) Prior Publication Data

US 2020/0207137 A1 Jul. 2, 2020

(30) Foreign Application Priority Data

Dec. 26, 2018 (JP) .............................. JP2018-242327

(51) Int. Cl.
*B41M 3/06* (2006.01)
*B41M 7/00* (2006.01)
*B41J 11/00* (2006.01)
*B29C 44/60* (2006.01)
(Continued)

(52) U.S. Cl.
CPC .......... *B41M 7/009* (2013.01); *B29C 35/0805* (2013.01); *B29C 44/3415* (2013.01); *B29C 44/60* (2013.01); *B41J 11/002* (2013.01); *B41M 3/06* (2013.01); *B29C 2035/0838* (2013.01)

(58) Field of Classification Search
CPC ........ B41M 7/009; B41M 3/06; B41J 11/002; B41J 2/01; B41J 25/001; B41J 29/393; B41J 3/4073; B29C 44/60; B29C 44/3415; B29C 35/0805; B29C 2035/0838; B29C 44/022; B29C 67/0011
See application file for complete search history.

(56) References Cited

U.S. PATENT DOCUMENTS

2013/0161874 A1\* 6/2013 Horiuchi ............. B29C 44/0461 264/415
2013/0168903 A1\* 7/2013 Horiuchi ............... B29C 44/022 264/413
(Continued)

FOREIGN PATENT DOCUMENTS

| JP | S6428660 A | 1/1989 |
|---|---|---|
| JP | H11344777 A | 12/1999 |
| JP | 2001150812 A | 6/2001 |

(Continued)

*Primary Examiner* — Huan H Tran
(74) *Attorney, Agent, or Firm* — Holtz, Holtz & Volek PC

(57) ABSTRACT

In a setting apparatus including a control unit, the control unit is configured to: set, by a user operation, an irradiation condition of a laser beam for a thermally expandable sheet, a surface of the thermally expandable sheet being heated and expanded by being irradiated with the laser beam; and control an output and a scanning speed of the laser beam in accordance with the set irradiation condition, and in the setting, (i) a surface state of the thermally expandable sheet after expansion is selectable from a plurality of mutually different surface states, and (ii) the irradiation condition is set by the user operation according to the surface state selected from among the plurality of surface states.

18 Claims, 10 Drawing Sheets

(51) Int. Cl.
     *B29C 44/34*   (2006.01)
     *B29C 35/08*   (2006.01)

(56) References Cited

U.S. PATENT DOCUMENTS

2014/0110887 A1* 4/2014 Horiuchi .................... B41J 3/28
                                                     264/413
2015/0070452 A1* 3/2015 Motoyanagi ............... B41J 3/60
                                                     347/102

FOREIGN PATENT DOCUMENTS

JP    2010138220 A    6/2010
JP    2016165831 A    9/2016

* cited by examiner

SETTING APPARATUS, SHAPING SYSTEM, SETTING METHOD, AND COMPUTER-READABLE RECORDING MEDIUM

This application claims priority to Japanese Patent Application No. 2018-242327 filed on Dec. 26, 2018, the content of which is incorporated herein in its entirety.

FILED

The present invention relates to a setting apparatus, a shaping system, a setting method, and a computer-readable recording medium.

BACKGROUND

Techniques for shaping a shaped object are known. For example, JP S64-28660 A and JP 2001-150812 A each disclose a method for forming, as a shaped object, a stereoscopic image that is an image having a three-dimensional shape. Specifically, in the method disclosed in JP S64-28660 A and JP 2001-150812 A, a pattern is formed on the back surface of a thermally expandable sheet with a material having excellent light absorption characteristics, and the formed pattern is heated by being irradiated with light using an irradiation section. Thus, the portion at which the pattern on the thermally expandable sheet has been formed is expanded and protrudes, thereby forming a stereoscopic image.

In order to expand a thermally expandable sheet as described above, there is a method for heating a thermally expandable sheet using a laser beam. Characteristics of a laser beam are suitable for heating a local region on a thermally expandable sheet, but are unsuitable for heating a wide region on a thermally expandable sheet at a time. Thus, in order to expand a thermally expandable sheet using a laser beam, it is desirable to appropriately set irradiation conditions of the laser beam according to a region on the thermally expandable sheet in consideration of the characteristics of the laser beam. Under such circumstances, users desire to easily set irradiation conditions of a laser beam with which a thermally expandable sheet is to be irradiated.

The present invention is to solve the above problem, and to provide a setting apparatus, a shaping system, a setting method, and a computer-readable recording medium that allow a user to easily set irradiation conditions of a laser beam with which a thermally expandable sheet is to be irradiated.

SUMMARY

In a setting apparatus including a control unit,
the control unit is configured to:
set, by a user operation, an irradiation condition of a laser beam for a thermally expandable sheet, a surface of the thermally expandable sheet being heated and expanded by being irradiated with the laser beam; and
control an output and a scanning speed of the laser beam in accordance with the set irradiation condition, and
in the setting, (i) a surface state of the thermally expandable sheet after expansion is selectable from a plurality of mutually different surface states, and (ii) the irradiation condition is set by the user operation according to the surface state selected from among the plurality of surface states.

A method for setting a setting apparatus configured to control an expanding apparatus including a laser includes:
a setting step of setting, by a user operation, an irradiation condition of a laser beam for a thermally expandable sheet, a surface of the thermally expandable sheet being heated and expanded by being irradiated with the laser beam; and
a controlling step of controlling an output and a scanning speed of the laser beam in accordance with the irradiation condition set in the setting step, wherein
in the setting step, (i) a surface state of the thermally expandable sheet after expansion is selectable from a plurality of mutually different surface states, and (ii) the irradiation condition is set by the user operation according to the surface state selected from among the plurality of surface states.

A computer-readable recording medium for controlling a setting apparatus including a control unit causes a computer to execute:
setting processing for setting, by a user operation, an irradiation condition of a laser beam for a thermally expandable sheet, a surface of the thermally expandable sheet being heated and expanded by being irradiated with the laser beam; and
laser controlling processing for controlling an output and a scanning speed of the laser beam in accordance with the irradiation condition set in the setting processing, wherein
in the setting processing, (i) a surface state of the thermally expandable sheet after expansion is selectable from a plurality of mutually different surface states, and (ii) the irradiation condition is set, by the user operation, according to the surface state selected from among the plurality of surface states.

DETAILED DESCRIPTION

Figure 1:
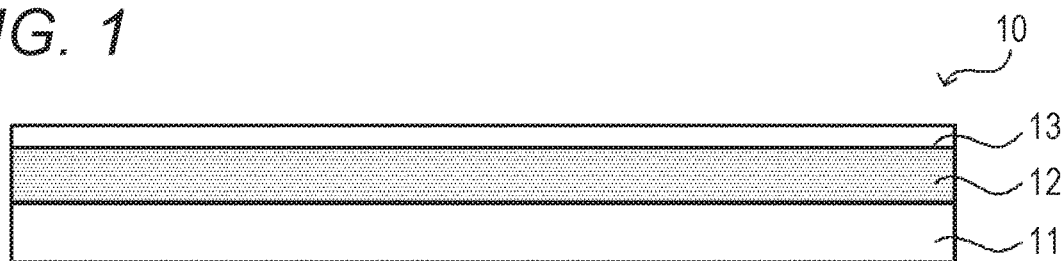
FIG. 1 is a cross-sectional view of a thermally expandable sheet according to a first embodiment of the present invention.

Embodiments of the present invention are described below with reference to the drawings. In the drawings, the same or equivalent elements are denoted by the same reference signs.

First Embodiment

<Thermally Expandable Sheet 10>

FIG. 1 is a cross-sectional view of a configuration of a thermally expandable sheet 10 for shaping a shaped object according to a first embodiment of the present invention. The thermally expandable sheet 10 is a medium for shaping a shaped object by expanding a preselected portion with heat. The shaped object is an object having a three-dimensional shape, and is shaped by expanding a portion of a two-dimensional sheet in a direction perpendicular to the sheet. The shaped object is also referred to as a stereoscopic object or a stereoscopic image. The shape of the shaped object includes a simple shape, a geometric shape, and a general shape, such as letters.

In other words, the shaped object in the first embodiment is an object having irregularities in a direction perpendicular to a specific two-dimensional surface in a three-dimensional space. Such a shaped object is included in a stereoscopic (3D) image, but is referred to as a 2.5-dimensional (2.5D) image or a pseudo-three-dimensional (pseudo-3D) image in order to distinguish it from stereoscopic images produced with what is called 3D printer technology. In addition, the technique for producing such a shaped object is included in a stereoscopic-image printing technique, but is referred to as a 2.5D printing technique or a pseudo-3D printing technique in order to distinguish it from what is called a 3D printer.

As shown in FIG. 1, the thermally expandable sheet 10 includes a base material 11, a thermally expandable layer 12, and an ink receiving layer 13 in this order. FIG. 1 shows a cross section of the thermally expandable sheet 10 before a shaped object is shaped, that is, any portion is not expanded.

The base material 11 is a sheet-like medium that is a base of the thermally expandable sheet 10. The base material 11 is a support body that supports the thermally expandable layer 12 and the ink receiving layer 13, and is used for maintaining the strength of the thermally expandable sheet 10. As the base material 11, general printing paper can be used, for example. Alternatively, the material of the base material 11 may be synthetic paper, a cloth such as canvas, or a plastic film such as polypropylene, polyethylene terephthalate (PET), or polybutylene terephthalate (PBT), and is not particularly limited.

The thermally expandable layer 12 is laminated on the upper side of the base material 11, and is a layer that expands when heated to a predetermined temperature or higher. The thermally expandable layer 12 includes a binder and a thermal expansion agent distributed in the binder. The binder is thermoplastic resin such as an ethylene vinyl acetate polymer or an acrylic polymer. Specifically, the thermal expansion agent is thermally expandable microcapsule (micropowder) having a particle size of about 5 to 50 μm and in which a substance having a low boiling point, such as propane or butane, is contained in an outer shell of thermoplastic resin. The contained substance is vaporized when the thermal expansion agent is heated to, for example, a temperature of about 80° C. to 120° C., and the thermal expansion agent is foamed and expanded by the pressure. In this manner, the thermally expandable layer 12 expands according to the amount of absorbed heat. The thermal expansion agent is also referred to as a foaming agent.

The ink receiving layer 13 is laminated on the upper side of the thermally expandable layer 12, and is a layer that absorbs and receives ink. The ink receiving layer 13 receives printing ink used in an ink jet printer, printing toner used in a laser printer, ink used for a ballpoint pen or a fountain pen, pencil graphite, and the like. The ink receiving layer 13 is formed of a suitable material for fixing them to the surface. As the material of the ink receiving layer 13, a general-purpose material used for inkjet paper can be used, for example.

Figure 2:
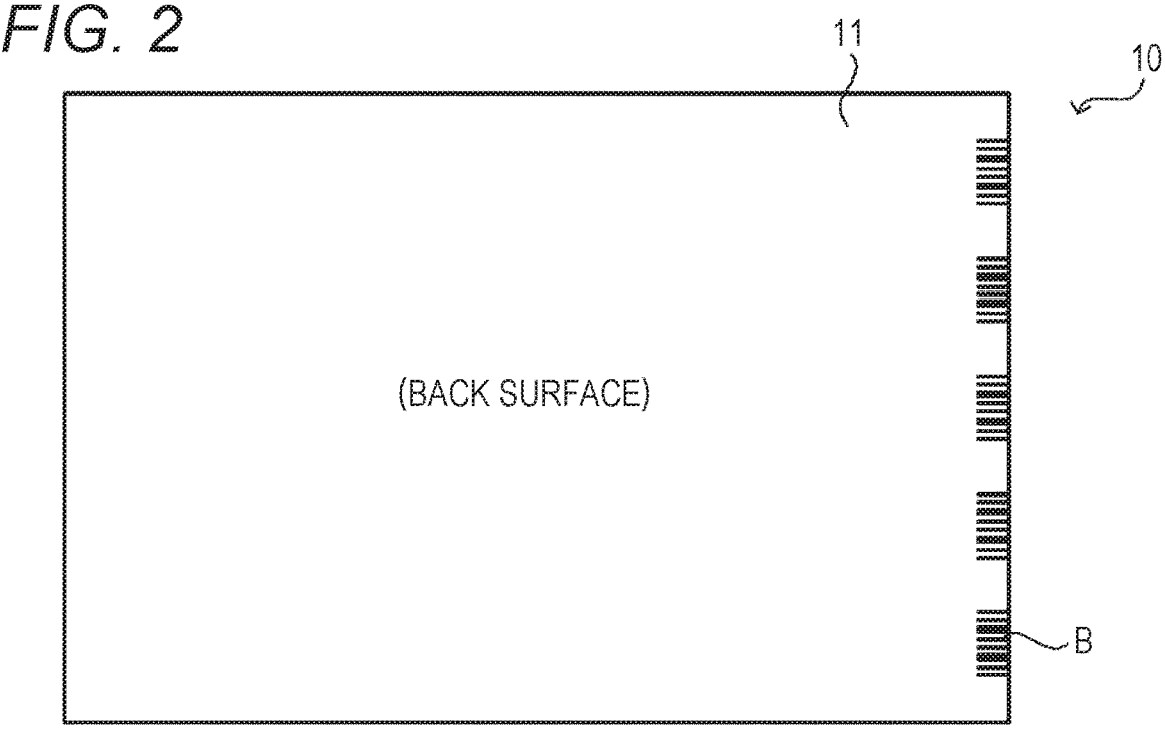
FIG. 2 is a diagram showing the back surface of the thermally expandable sheet shown in FIG. 1.

FIG. 2 shows the back surface of the thermally expandable sheet 10. The back surface of the thermally expandable sheet 10 is the surface of the thermally expandable sheet 10 on the base material 11 side and corresponds to the back surface of the base material 11. As shown in FIG. 2, a plurality of barcodes B is provided on the back surface of the thermally expandable sheet 10 along the edge. Each of the plurality of barcodes B is an identifier to be read by the expanding apparatus 50, and indicates that the thermally expandable sheet 10 is a dedicated sheet for shaping a shaped object.

Figure 3:
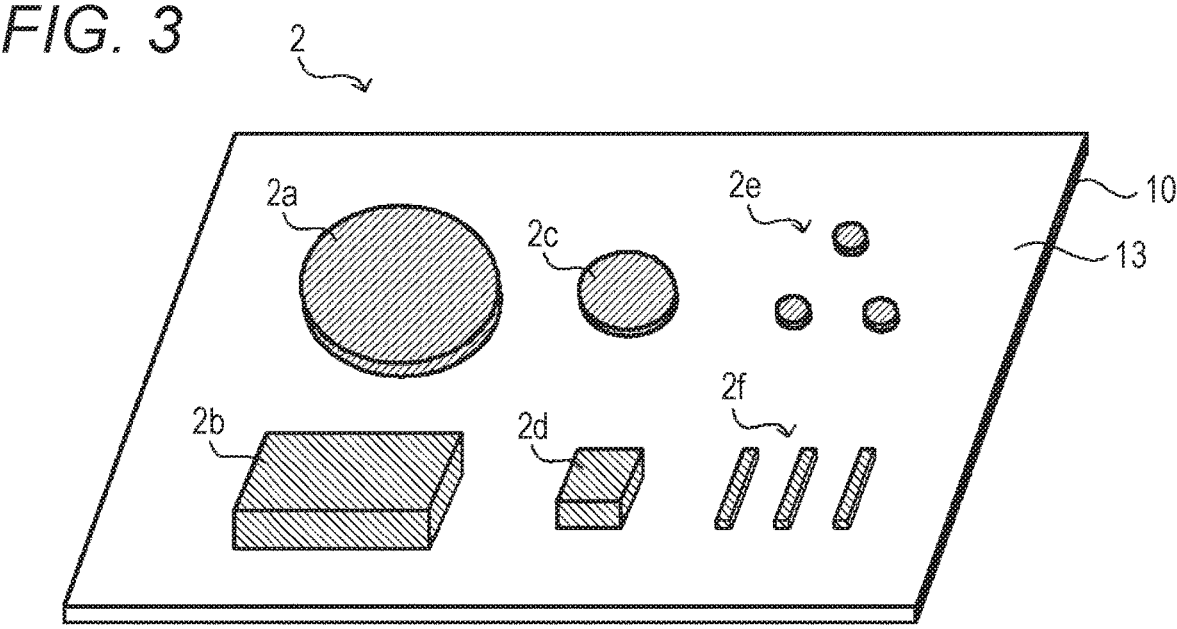
FIG. 3 is a diagram showing examples of a shaped object shaped by a shaping system according to the first embodiment.

A shaping system 1 can shape various shaped objects on such the thermally expandable sheet 10. FIG. 3 specifically shows examples of a shaped object 2 shaped in the thermally expandable sheet 10. When a portion of the thermally expandable sheet 10 to be expanded is heated, the thermally expandable layer 12 at the portion expands, and the surface protrudes, which forms bumps. By shaping protrusions or irregular shapes with the bumps of the thermally expandable layer 12, the shaped object 2 including a plurality of three-dimensional shapes 2a to 2f having various sizes and shapes as shown in FIG. 3 can be shaped in thermally expandable sheet 10.

By combining positions and heights of the thermally expandable sheet 10 to be expanded, a variety of shaped objects can be obtained. Note that, expressing a sense of beauty or a texture through a sense of vision or touch with shaping is referred to as "decoration".

<Shaping System 1>

Figure 4:
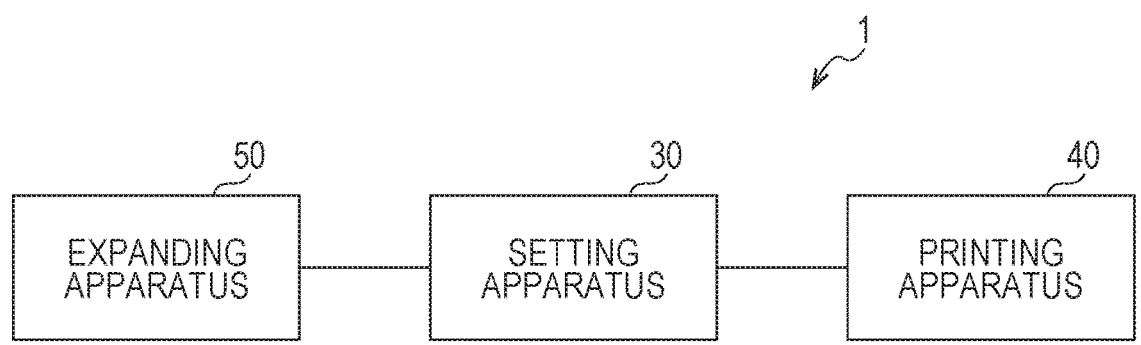
FIG. 4 is a diagram showing a schematic configuration of the shaping system according to the first embodiment.

Next, the shaping system 1 that shapes a shaped object 2 in the thermally expandable sheet 10 is described with reference to FIG. 4. As shown in FIG. 4, the shaping system 1 includes a setting apparatus 30, a printing apparatus 40, and an expanding apparatus 50.

<Expanding Apparatus 50>

The expanding apparatus 50 is an expanding unit that irradiates the thermally expandable sheet 10 with an electromagnetic wave to heat and expand the thermally expandable sheet 10. The expanding apparatus 50 functions as an expanding section.

Figure 5:
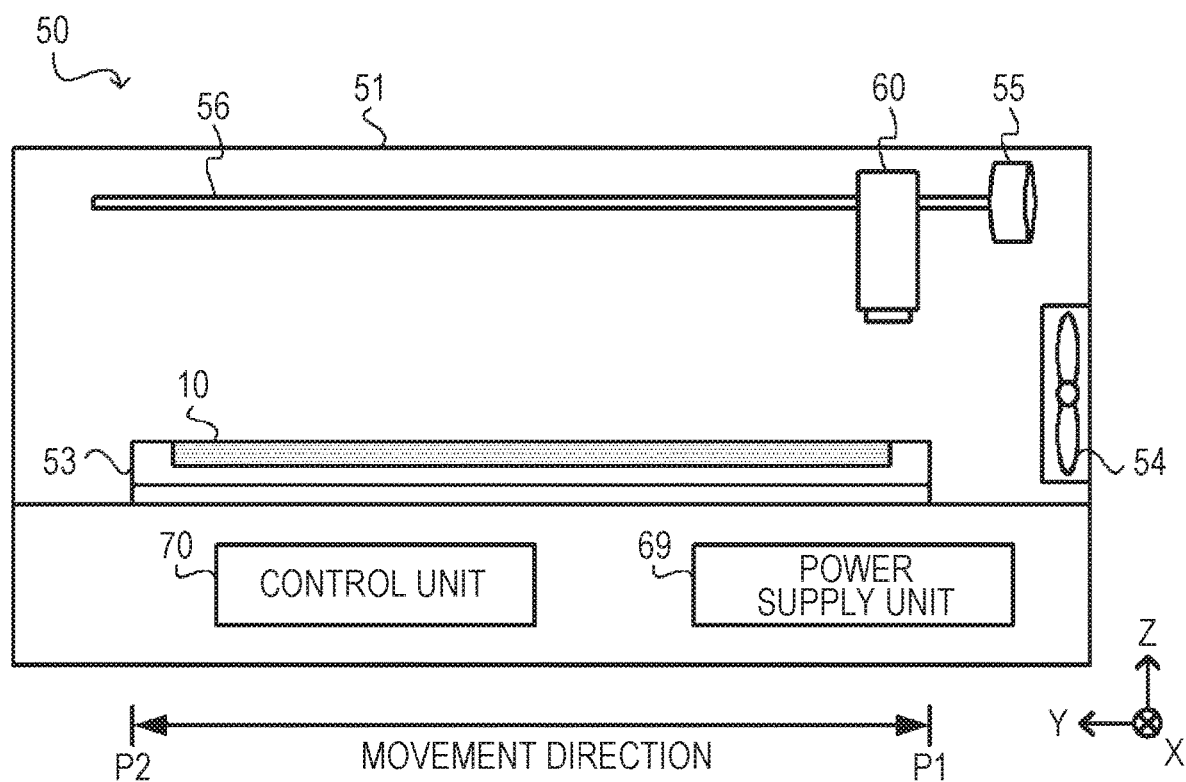
FIG. 5 is a cross-sectional view of a configuration of an expanding apparatus according to the first embodiment.

FIG. 5 schematically shows a configuration of the expanding apparatus 50. In FIG. 5, the X direction corresponds to the width direction of the expanding apparatus 50, the Y direction corresponds to the longitudinal direction of the expanding apparatus 50, and the Z direction corresponds to the vertical direction. The X direction, the Y direction, and the Z direction are orthogonal to each other. As shown in FIG. 5, the expanding apparatus 50 includes a casing 51, a tray 53, a ventilation unit 54, a conveyance motor 55, a conveyance rail 56, a laser irradiation unit 60, a power supply unit 69, and a control unit 70.

The tray 53 is a mechanism for disposing the thermally expandable sheet 10 at an appropriate position in the casing 51. The tray 53 is installed so as to be able to be pulled out from the inside of the casing 51. The user slides and pulls out the tray 53 and places the thermally expandable sheet 10 on the tray 53. When the tray 53 on which the thermally expandable sheet 10 has been placed is returned to the inside of the casing 51, the thermally expandable sheet 10 is disposed at a position where the laser irradiation unit 60 can irradiate the sheet with an electromagnetic wave. The thermally expandable sheet 10 placed on the tray 53 is fixed by pressing the four sides edges from above.

The ventilation unit 54 is provided at the back end of the expanding apparatus 50 and ventilates the inside of the expanding apparatus 50. The ventilation unit 54 includes at least one fan, and ventilates the inside of the casing 51 by discharging the air inside the casing 51 to the outside.

The conveyance motor 55 is, for example, a stepping motor that operates in synchronization with pulse power, and moves the laser irradiation unit 60 along the thermally expandable sheet 10. The laser irradiation unit 60 is attached to the conveyance rail 56 provided in the Y direction inside the casing 51. The laser irradiation unit 60 uses the driving force caused by the rotation of the conveyance motor 55 as a power source and reciprocates along the conveyance rail 56 while keeping a constant distance from the thermally expandable sheet 10. The conveyance motor 55 functions as a movement section for relatively moving the thermally expandable sheet 10 and the laser irradiation unit 60.

Specifically, the laser irradiation unit 60 reciprocates between a first position P1 corresponding to one end of the thermally expandable sheet 10 and a second position P2 corresponding to the other end of the thermally expandable sheet 10. The conveyance motor 55 moves the laser irradiation unit 60 in a first direction from the first position P1 to the second position P2, and in a second direction from the second position P2 to the first position P1. The first position P1 is an initial position (home position) of the laser irradiation unit 60. The laser irradiation unit 60 stands by at the first position P1 while the expanding apparatus 50 is not operating.

The laser irradiation unit 60 irradiates the surface of the thermally expandable sheet 10 with a laser beam. The laser irradiation unit 60 is a laser irradiator using, for example, carbon dioxide gas or Yttrium Aluminum Garnet (YAG) crystal. The laser irradiation unit 60 includes a laser oscillation unit that amplifies light to oscillate a laser beam and a polygon mirror that changes a laser irradiation direction, although they are not shown. The laser irradiation unit 60 reflects the laser beam oscillated by the laser oscillating unit by the polygon mirror and performs scanning in the +X direction and the −X direction. Then, the laser irradiation unit 60 irradiates a predetermined irradiation region of the thermally expandable sheet 10 placed on the tray 53 with the laser beam while being moved by the conveyance motor 55 in the +Y direction and the −Y direction. The laser irradiation unit 60 functions as a laser irradiation section for irradiating the thermally expandable sheet 10 with a laser beam.

When the thermally expandable sheet 10 is irradiated with the laser beam, the portion of the thermally expandable sheet 10 irradiated with the laser beam receives energy and is heated. When the thermally expandable sheet 10 is heated to a temperature at which the thermal expansion agent starts to expand, the thermally expandable sheet 10 expands.

In this manner, the expanding apparatus 50 can heat, using a laser, a narrower range on the thermally expandable sheet 10 than using a halogen lamp or the like. In other words, if a halogen lamp is used, a wide range on the thermally expandable sheet 10 is irradiated at a time with an electromagnetic wave, and it is difficult to reproduce fine lines and dots due to the influence of leakage of heat. In contrast, the expanding apparatus 50 heats and expands the thermally expandable sheet 10 with a laser beam, and it is possible to accurately express fine lines, dots, and the like included in a shaped object. In other words, using a laser makes it possible to produce a shaped object with higher resolution than using a halogen lamp. Furthermore, when a halogen lamp is used, it is required to print a pattern on a portion of the thermally expandable sheet 10 to be expanded with a material, such as carbon black, that converts electromagnetic waves into heat. In contrast, when a laser is used, a portion of the thermally expandable sheet 10 to be expanded can be directly heated, and it is possible to reduce the number of steps for producing a shaped object.

The power supply unit 69 includes a power supply integrated circuit (IC), and generates and supplies necessary power to the units of the expanding apparatus 50.

The control unit 70 is provided on a substrate disposed at the lower part of the casing 51. The control unit 70 includes a central processing unit (CPU), a read only memory (ROM), and a random-access memory (RAM), and is connected to the units of the expanding apparatus 50 via a system bus that is a transmission path for transferring commands and data. In the control unit 70, the CPU loads a control program stored in the ROM and controls the entire motion of the expanding apparatus 50 using the RAM as a work memory. The control unit 70 includes a non-volatile memory, such as a flash memory and a hard disk, and a communication interface for communicating with the setting apparatus 30, although they are not shown.

<Printing Apparatus 40>

The printing apparatus 40 is a printing unit that prints images on the front surface or the back surface of the thermally expandable sheet 10. The printing apparatus 40 functions as a printing section. The printing apparatus 40 is, for example, an ink jet printer that prints images by atomizing ink and spraying it directly onto a printing medium.

Figure 6:
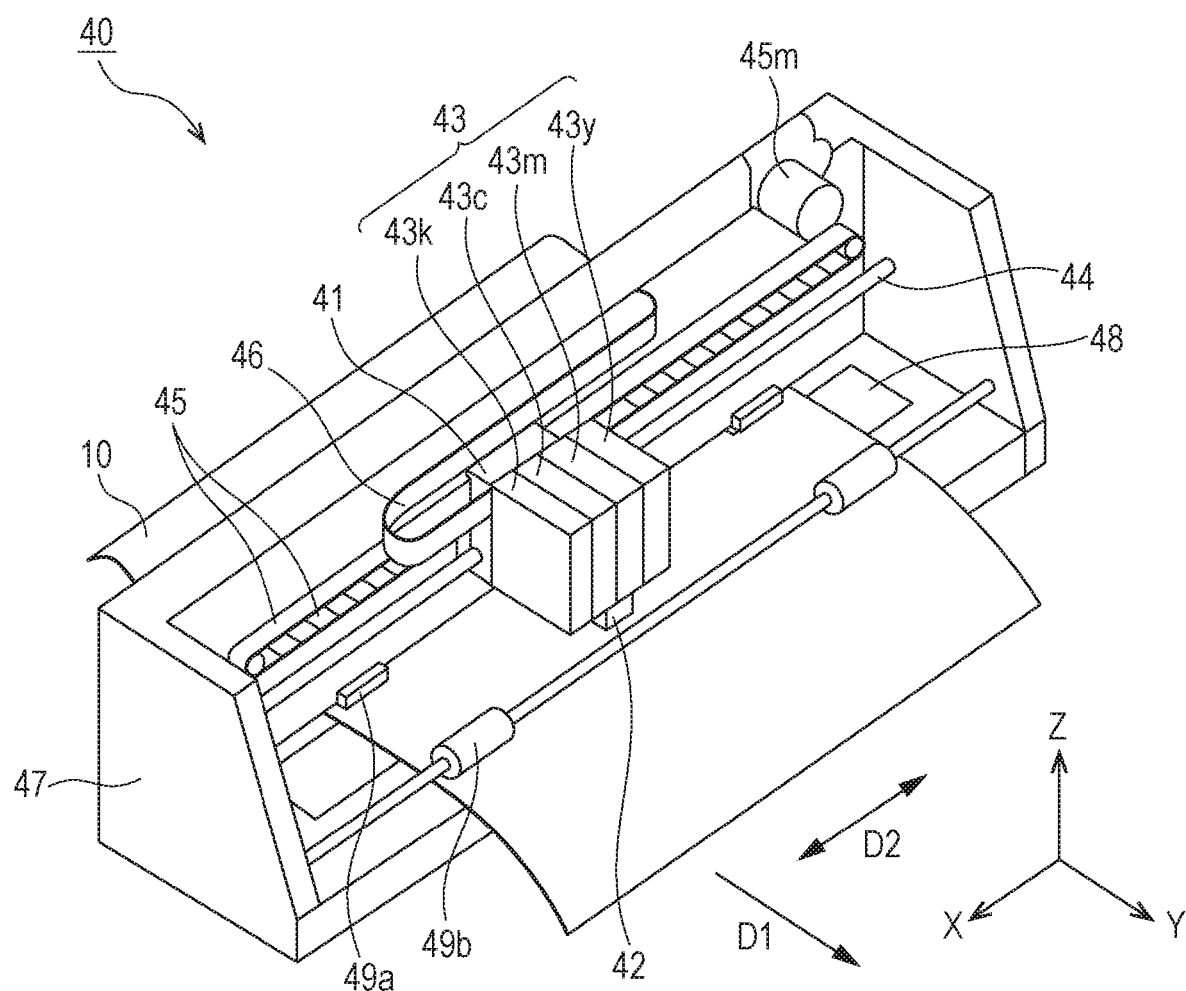
FIG. 6 is a perspective view of a configuration of a printing apparatus according to the first embodiment.

FIG. 6 shows a detailed configuration of the printing apparatus 40. As shown in FIG. 6, the printing apparatus 40 includes a carriage 41 that can reciprocate in a main scanning direction D2 (X direction) orthogonal to a sub-scanning direction D1 (Y direction), which is the direction in which the thermally expandable sheet 10 is conveyed.

A print head 42 that performs printing, and an ink cartridge 43 (43k, 43c, 43m, and 43y) containing ink are attached to the carriage 41. The ink cartridges 43k, 43c, 43m, and 43y contain black K, cyan C, magenta M, and yellow Y color inks, respectively. Each color ink is ejected from the corresponding nozzle of the print head 42.

The carriage 41 is slidably supported on the guide rail 44 and is sandwiched by a driving belt 45. The carriage 41 moves in the main scanning direction D2 together with the print head 42 and the ink cartridge 43 when the driving belt 45 is driven by the rotation of a motor 45m.

A platen 48 is provided at the lower part of a frame 47 and at a position facing the print head 42. The platen 48 extends in the main scanning direction D2, and constitutes a part of the conveyance path of the thermally expandable sheet 10. A pair of feeding rollers 49a (a lower roller is not shown) and a pair of discharging rollers 49b (a lower roller is not shown) are provided in the conveyance path of the thermally expandable sheet 10. The pair of feeding rollers 49a and the pair of discharging rollers 49b convey the thermally expandable sheets 10 supported by the platen 48 in the sub-scanning direction D1.

The printing apparatus 40 includes a control unit, such as a CPU, and a storage unit, such as a ROM, a RAM, and a non-volatile memory, although they are not shown. In the control unit, the CPU executes a control program stored in the ROM and controls the motion of the printing apparatus 40 using the RAM as a work memory. The printing apparatus 40 is connected to the setting apparatus 30 via a flexible communication cable 46. The printing apparatus 40 acquires print data from the setting apparatus 30 via the flexible communication cable 46 under the control of the control unit. Then, the printing apparatus 40 performs printing on the thermally expandable sheet 10 in accordance with the acquired print data.

Specifically, the printing apparatus 40 controls the pair of feeding rollers 49a and the pair of discharging rollers 49b to convey the thermally expandable sheet 10. The printing apparatus 40 further rotates the motor 45m to move the carriage 41, and conveys the print head 42 to an appropriate position in the main scanning direction D2. Then, the printing apparatus 40 causes the print head 42 to eject ink toward the thermally expandable sheet 10 being conveyed. The printing apparatus 40 thereby prints a color image on the surface of the thermally expandable sheet 10 with at least one of the color inks including cyan C, magenta M, yellow Y, and black K.

<Setting Apparatus 30>

The setting apparatus 30 is an information processing apparatus, such as a personal computer, a smartphone, or a tablet, and is a terminal device for controlling the motion of the printing apparatus 40 and the expanding apparatus 50 under the operation of the user. Specifically, the setting apparatus 30 sets and displays an irradiation condition of a laser beam for the thermally expandable sheet 10 in the expanding apparatus 50.

Figure 7:
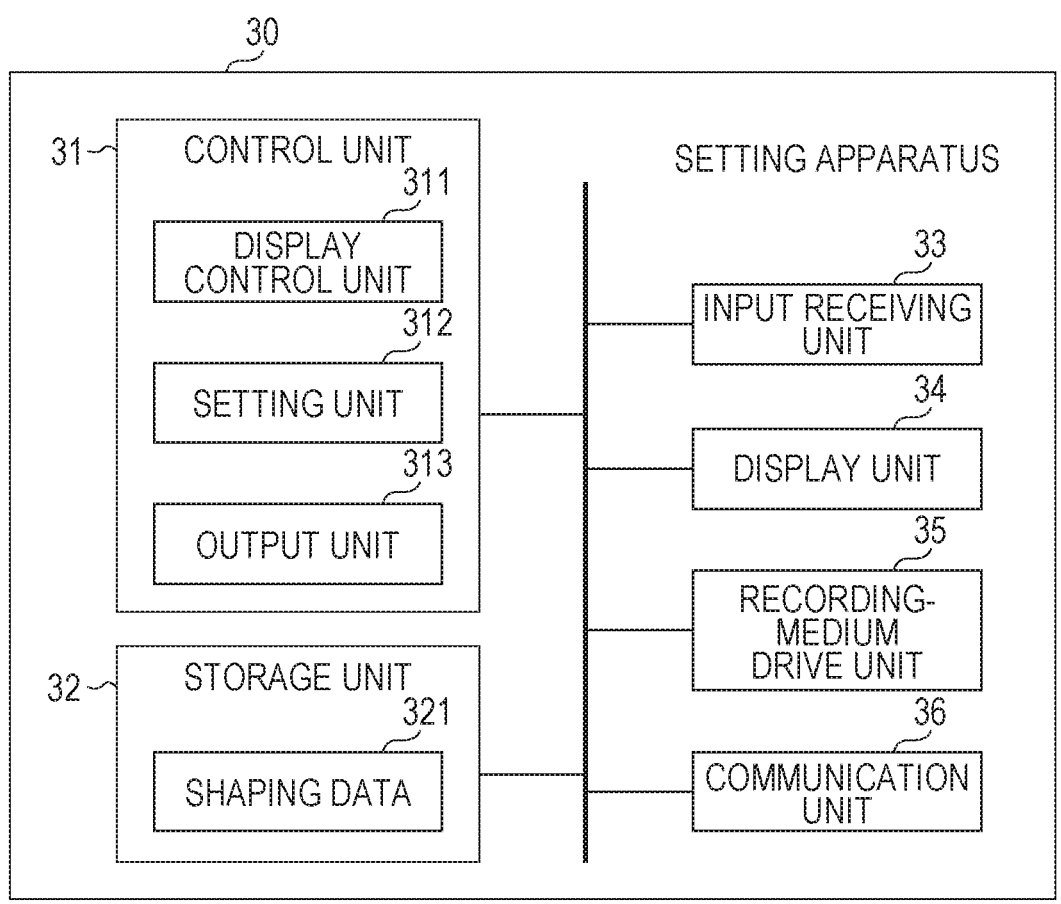
FIG. 7 is a block diagram showing a configuration of a setting apparatus according to the first embodiment.

FIG. 7 shows a configuration of the setting apparatus 30. As illustrated in FIG. 7, the setting apparatus 30 includes a control unit 31, a storage unit 32, an input receiving unit 33, a display unit 34, a recording-medium drive unit 35, and a communication unit 36. These units are connected by a bus for transmitting signals.

The control unit 31 includes a CPU, a ROM, and a RAM. The CPU is, for example, a microprocessor or the like that performs various types of processing and operation. In the control unit 31, the CPU loads a control program stored in the ROM and controls the entire motion of the setting apparatus 30 using the RAM as a work memory.

The storage unit 32 is a non-volatile memory, such as a flash memory or a hard disk. The storage unit 32 stores programs and data to be executed by the control unit 31.

In particular, the storage unit 32 stores shaping data 321 for shaping, in the thermally expandable sheet 10, various shaped objects including the shaped object 2 illustrated in FIG. 3. The shaping data 321 includes expansion data indicating the position and height on the thermally expandable sheet 10 in order for the expanding apparatus 50 to form bumps, and print data in order for the printing apparatus 40 to print a color image on the thermally expandable sheet 10. More specifically, the expansion data indicates the position of the thermally expandable sheet 10 to be irradiated with a laser beam in association with the height to which the thermally expandable sheet 10 is to expand when the position is irradiated with the laser beam, that is, the height of the bump (the degree of bump). The shaping data 321 is loaded from a recording medium by the recording-medium drive unit 35 or acquired from an external device via the communication unit 36, and stored in the storage unit 32 in advance.

The input receiving unit 33 includes input devices, such as a keyboard, a mouse, a button, a touch pad, and a touch panel, and receives an operation input from a user (user operation). For example, the user can input an operation for designating the shaped object 2 to be shaped or an operation for editing the shaping data 321 by operating the input receiving unit 33. The input receiving unit 33 functions as an input receiving section.

The display unit 34 includes a display apparatus, such as a liquid crystal display or an organic electro luminescence (EL) display, and displays various images under the control of the control unit 31. For example, the display unit 34 displays the image of the shaped object 2 and a setting screen for shaping the shaped object 2. The display unit 34 functions as a display section.

The recording-medium drive unit 35 loads a program or data recorded in a portable recording medium. The portable recording medium includes a compact disc (CD)-ROM, a digital versatile disc (DVD)-ROM, and a flash memory equipped with a universal-serial-bus (USB) standard connector. For example, the recording-medium drive unit 35 loads and acquires the shaping data 321 from a portable recording medium.

The communication unit 36 includes an interface for communicating with external devices including the printing apparatus 40 and the expanding apparatus 50. The setting apparatus 30 is connected to the printing apparatus 40 and the expanding apparatus 50 via cables, such as a flexible cable or a wired local area network (LAN), or via radio, such as a wireless LAN or Bluetooth (registered trademark). The communication unit 36 communicates with the printing apparatus 40, the expanding apparatus 50, and other external devices in accordance with at least one of these communication standards, under the control of the control unit 31.

As shown in FIG. 7, the control unit 31 functionally includes a display control unit 311 that functions as a display control section, a setting unit 312 that functions as a setting section, and an output unit 313 that functions as an output section. In the control unit 31, these units function by the CPU loading a program stored in the ROM into the RAM and executing the program to perform control.

The display control unit 311 generates various images according to situations, and displays the generated images on the display unit 34. For example, the display control unit 311 displays, on the display unit 34, a screen for the user to designate a shaped object to be shaped in the thermally expandable sheet 10 by the expanding apparatus 50, a screen for showing the appearance of the selected shaped object, a screen for setting the operating conditions of the expanding apparatus 50 and the printing apparatus 40, and the like.

Figure 8:
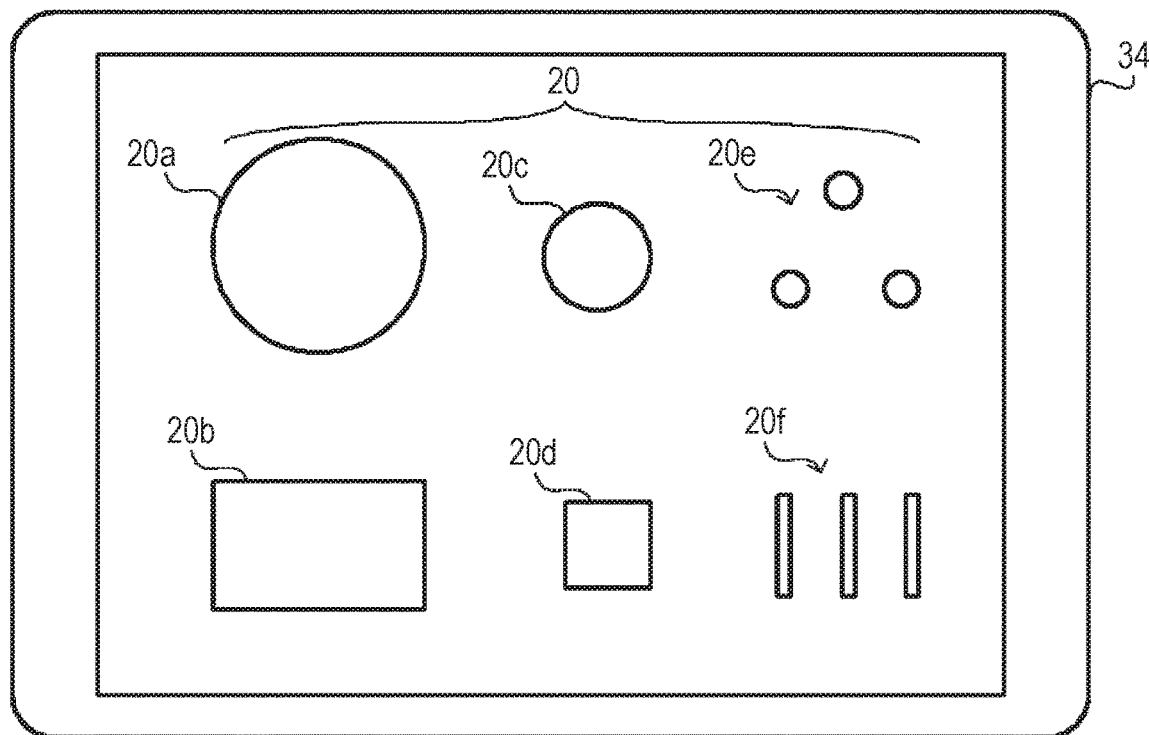
FIG. 8 is a diagram showing a display example of an irradiation region on a thermally expandable sheet to be irradiated with a laser beam in the first embodiment.

More specifically, the display control unit 311 distinguishably displays, on the display unit 34, a preview of an irradiation region 20, which is a region on the thermally expandable sheet 10 to be irradiated with a laser beam by the expanding apparatus 50 when a shaped object is shaped. FIG. 8 shows an example of the irradiation region 20 displayed on the display unit 34. The irradiation region 20 shown in FIG. 8 is a region to be irradiated with a laser beam by the expanding apparatus 50 in order to shape the shaped object 2 shown in FIG. 3, and corresponds to a position at which the thermally expandable sheet 10 is to be expanded.

As shown in FIG. 8, the irradiation region 20 includes a plurality of partial regions 20a to 20f. The partial regions 20a to 20f correspond to regions on the thermally expandable sheet 10 at which a plurality of three-dimensional shapes 2a to 2f included in the shaped object 2 is formed, when the thermally expandable sheet 10 is viewed from the front side. As described above, the thermally expandable sheet 10 is irradiated with a laser beam by the expanding apparatus 50, and the position irradiated with the laser beam is heated and expanded, thereby forming the shaped object 2. The irradiation region 20 is a region on the thermally expandable sheet 10 to be irradiated with a laser beam in order to shape the shaped object 2 in this manner. If the heights of the bumps of the plurality of three-dimensional shapes 2a to 2f are mutually different, the plurality of partial regions 20a to 20f are mutually differently heated with laser irradiation, and expanded to mutually different heights.

When the shaped object 2 shown in FIG. 3 is designated as a shaping target by the user, the display control unit 311 refers to the shaping data 321 stored in the storage unit 32, and specifies the irradiation region 20 corresponding to the designated shaped object 2. Then, the display control unit 311 generates a two-dimensional image representing the specified irradiation region 20, and displays the image on the display unit 34, as shown in FIG. 8. The display control unit 311 is implemented by the control unit 31 cooperating with the display unit 34.

Returning to FIG. 7, the setting unit 312 sets the laser irradiation conditions for the respective partial regions 20a to 20f, which are a plurality of portions in the irradiation region 20 displayed on the display unit 34. The laser irradiation conditions are various setting conditions, such as the laser irradiation intensity and irradiation time when the surface of the thermally expandable sheet 10 is irradiated with a laser beam, and are conditions for the irradiation region 20 to be expanded to the height determined by the shaping data 321. Specifically, the setting unit 312 sets, as the laser irradiation condition, at least one of the laser output intensity, the laser condensing degree, and the relative movement speed (laser scanning speed) between the thermally expandable sheet 10 and the laser irradiation unit 60, which is the laser irradiation source.

The laser output intensity corresponds to the average energy output per unit time from the light source when the surface of the thermally expandable sheet 10 is irradiated with a laser beam. As the laser output intensity increases, the energy applied to the thermally expandable sheet 10 per unit time increases, and the thermally expandable sheet 10 is heated more intensively.

The laser condensing degree corresponds to the size of the laser spot diameter on the surface of the thermally expandable sheet 10 when the surface of the thermally expandable sheet 10 is irradiated with a laser beam. In other words, the laser condensing degree corresponds to the size of the area that can be irradiated with a laser beam per one scan. The laser condensing degree is adjusted by changing the focal length of the laser beam. If the laser condensing degree is large, the laser spot diameter on the surface of the thermally expandable sheet 10 becomes small, and the heating amount per unit area increases. Thus, the thermally expandable sheet 10 is locally heated more intensively. On the other hand, if the laser condensing degree is small, the laser spot diameter on the surface of the thermally expandable sheet 10 becomes large, and the heating amount per unit area is reduced.

The relative movement speed between the thermally expandable sheet 10 and the laser irradiation unit 60 is the relative movement speed between the thermally expandable sheet 10 and the laser irradiation unit 60 when the surface of the thermally expandable sheet 10 is irradiated with a laser beam while either the thermally expandable sheet 10 is being scanned or the laser irradiation unit 60 is performing scanning, and can also be referred to as a laser scanning speed. Since the thermally expandable sheet 10 is fixed to the tray 53 in the expanding apparatus 50 in the first embodiment, the relative movement speed corresponds to the speed of the laser irradiation unit 60 moved by the conveyance motor 55. If the movement speed is high, the time during which the portions of the thermally expandable sheet 10 are irradiated with a laser beam is reduced, and the heating amount to the thermally expandable sheet 10 per unit area is reduced. On the other hand, if the movement speed is low, the time during which the portions of the thermally expandable sheet 10 are irradiated with a laser beam is increased, and the heating amount to the thermally expandable sheet 10 per unit area is increased.

Figure 9:
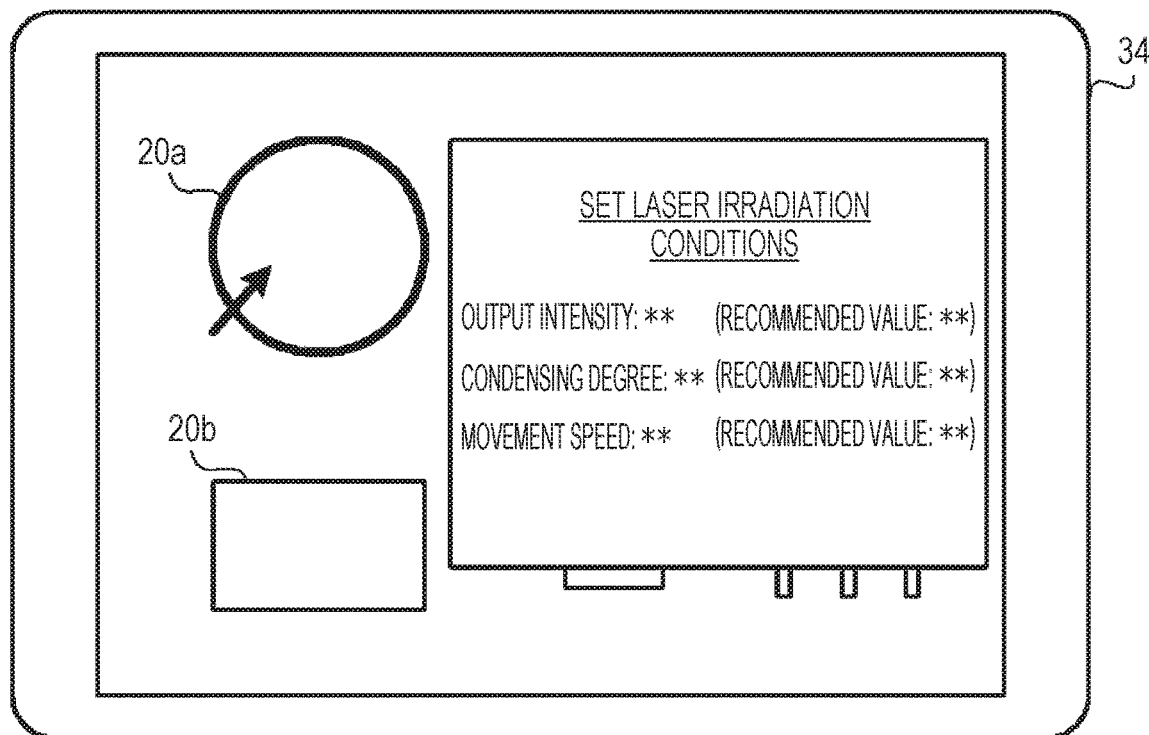
FIG. 9 is a diagram showing an example of a setting screen for a laser irradiation condition in the first embodiment.

The setting unit 312 sets the laser irradiation conditions for the respective partial regions 20a to 20f in the irradiation region 20 in accordance with the operation input (user operation) received by the input receiving unit 33. FIG. 9 shows, as an example, that the laser irradiation condition is being set for the partial region 20a in the irradiation region 20 displayed on the display unit 34. As shown in FIG. 9, the user operates the input receiving unit 33 to select the partial region 20a as a target for setting a laser irradiation condition. The display control unit 311 displays a setting screen for setting the laser output intensity, the laser condensing degree, and the laser scanning speed for the selected partial region 20a. The user inputs setting values on such the setting screen to set the laser irradiation conditions for the respective partial regions 20a to 20f.

In this manner, the user can select, from among a plurality of mutually different set values, each of the three parameters of the output intensity, the light condensing degree, and the scanning speed of a laser beam. In other words, the setting unit 312 is configured so that an irradiation condition for expanding the thermally expandable sheet 10 to a predetermined height that is a target expansion height is selectable from among a plurality of mutually different irradiation conditions. The setting unit 312 is implemented by the control unit 31 cooperating with the input receiving unit 33.

More specifically, when the input receiving unit 33 has received the irradiation condition for a partial region among the plurality of partial regions 20a to 20f, the setting unit 312 sets the irradiation condition for the partial region in accordance with the received input. On the other hand, when the input receiving unit 33 has not received the irradiation condition for a partial region among the plurality of partial regions 20a to 20f, the setting unit 312 sets the irradiation condition for the partial region based on the area or width of the partial region for which no input has been received.

Specifically, the expansion heights necessary for shaping the shaped object 2 are determined in advance for the respective partial regions 20a to 20f in the shaping data 321.

When the input receiving unit 33 has not receive the input of the irradiation conditions, the setting unit 312 sets the irradiation conditions to values suitable for the respective partial regions 20a to 20f to be expanded to necessary heights in order to shape the shaped object 2.

In general, as the expansion height is higher, the required heating amount is larger. Thus, if the number of laser irradiation times is the same, the setting unit 312 sets the irradiation condition for a portion of the thermally expandable sheet 10 at which the expansion height is relatively high so that the output intensity is increased, the condensing degree is increased, or the movement speed is lowered compared to a portion of the thermally expandable sheet 10 at which the expansion height is relatively low.

As described above, if no irradiation condition has been input by the user, the setting unit 312 automatically sets the irradiation conditions according to the expansion heights of the respective partial regions 20a to 20f without the user input. The setting unit 312 further sets the laser irradiation conditions according to the areas or widths of the respective partial regions 20a to 20f.

More specifically, if at least two partial regions among the plurality of partial regions 20a to 20f for which the irradiation conditions have not been received by the input receiving unit 33 have the same area and width, and if the at least two partial regions are to be expanded to the same height, the setting unit 312 sets the same irradiation conditions for the at least two partial regions. On the other hand, if the at least two partial regions are to be expanded to different heights, the setting unit 312 sets the irradiation conditions for the at least two partial regions according to the expansion heights. That is, the setting unit 312 sets the irradiation condition for the partial region of the at least two partial regions at which the expansion height is relatively high so that the output intensity is increased, the condensing degree is increased, or the movement speed is lowered compared to the partial region at which the expansion height is relatively low.

On the other hand, if at least two partial regions among the plurality of partial regions 20a to 20f for which the irradiation conditions have not been received by the input receiving unit 33 have different areas or widths, the setting unit 312 sets mutually different irradiation conditions for the at least two partial regions although the at least two partial regions are to be expanded to the same height with laser irradiation.

Specifically, as the irradiation condition for a partial region among the plurality of partial regions 20a to 20f for which the irradiation condition has not been received by the input receiving unit 33, the setting unit 312 sets at least one of the laser output intensity, the laser condensing degree, and the movement speed of the laser irradiation unit 60 for the partial region for which the irradiation condition has not been received to a smaller value when the area or width of the partial region is wider. For example, the setting unit 312 sets the laser output intensity, the condensing degree, and the movement speed of the laser irradiation unit 60 for the partial regions 20a and 20b having relatively large areas and widths in the irradiation region 20 to relatively small values. In addition, the setting unit 312 sets the laser output intensity, the condensing degree, and the movement speed of the laser irradiation unit 60 for the partial regions 20c and 20d having relatively middle areas and widths in the irradiation region 20 to values smaller than those for the partial regions 20a and 20b. Furthermore, the setting unit 312 sets the laser output intensity, the condensing degree, and the movement speed of the laser irradiation unit 60 for the partial region 20e having a relatively small area and the partial region 20f having a relatively narrow width in the irradiation region 20 to values greater than those for the partial regions 20c and 20d.

Generally, if the laser output intensity and the movement speed of the laser irradiation unit 60 are both large or both small, heating is intensely performed in a short time in the former case, and is slowly performed for a long time in the latter case, although the total heating amount is the same. In addition, if the laser condensing degree is small, the spot diameter on the thermally expandable sheet 10 becomes large, and a wide region on the thermally expandable sheet 10 is heated at a time. On the other hand, if the laser condensing degree is large, the spot diameter on the thermally expandable sheet 10 becomes small, and a narrow region on the thermally expandable sheet 10 can be locally heated, which is suitable for expanding a region having a narrow area or width with high resolution.

Thus, the setting unit 312 sets the output intensity, the condensing degree, and the movement speed to relatively small values to irradiate the partial regions 20a and 20b having relatively wide areas or widths. The setting unit 312 thereby enhances the heat storage property of the regions to be irradiated with a laser beam to expand the entire regions as evenly as possible. In contrast, the setting unit 312 sets the output intensity, the condensing degree, and the movement speed to relatively large values to irradiate the partial regions 20e and 20f having relatively narrow areas or widths. The setting unit 312 thereby locally intensively heats the regions to be irradiated with a laser beam in a short time to be sharply expanded.

The set values of the irradiation conditions based on the areas or widths of the partial regions 20a to 20f are defined in advance for the respective partial regions 20a to 20f as default values. The display unit 34 displays the set values defined in advance for the respective partial regions 20a to 20f as recommended irradiation conditions for the respective partial regions 20a to 20f. Specifically, for example, when the partial region 20a is selected as shown in FIG. 9, the display control unit 311 displays, on the display unit 34, the respective recommended values of the laser output intensity, the laser condensing degree, and the laser irradiation unit 60 for the selected partial region 20a.

The user operates the input receiving unit 33 while viewing the recommended values of the irradiation conditions displayed on the display unit 34 to set the irradiation conditions for the partial regions 20a to 20f. This makes it easy for the user to input appropriate irradiation conditions for accurately expanding the partial regions 20a to 20f. In addition, the irradiation conditions can be set to values different from the displayed recommended values, and the user can finely adjust the irradiation conditions according to situations. If no irradiation condition has been set by the user, the setting unit 312 automatically sets the irradiation conditions for the partial regions 20a to 20f to the recommended values defined in advance based on the areas or widths of the partial regions 20a to 20f.

Figure 10:
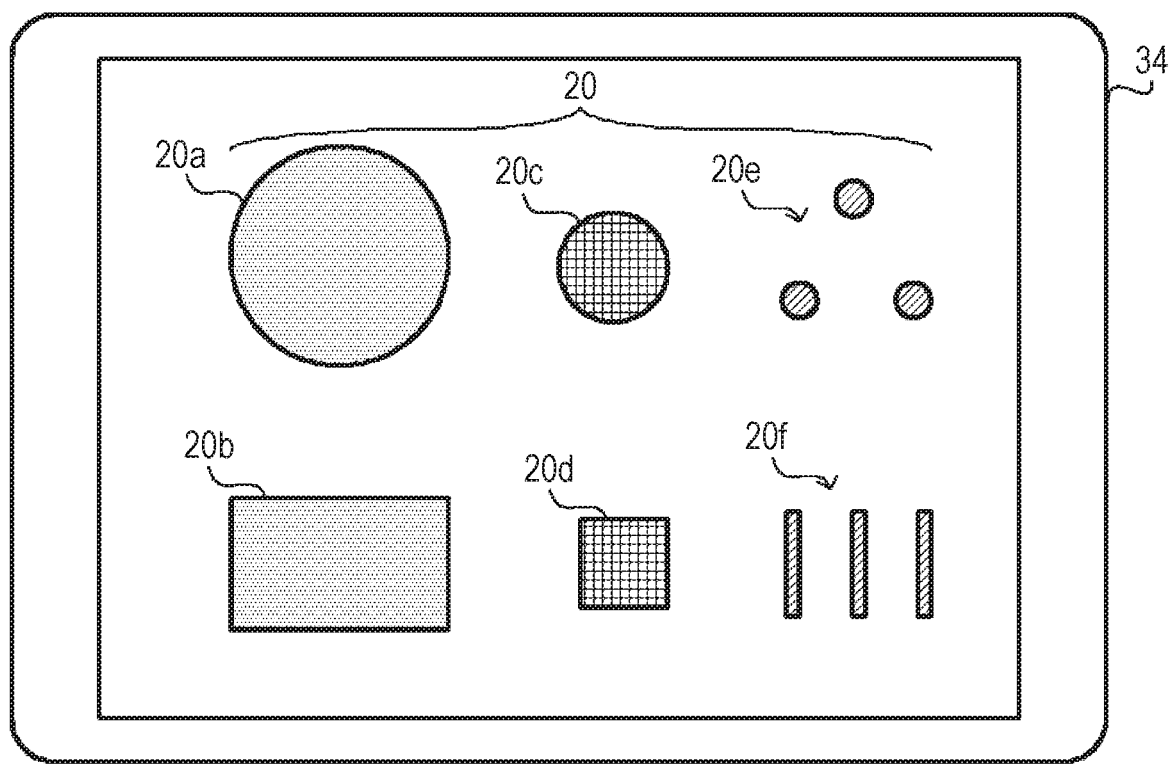
FIG. 10 is a diagram showing an example of an irradiation region displayed in a mode according to the laser irradiation condition in the first embodiment.

The display control unit 311 displays a preview of the plurality of partial regions 20a to 20f having mutually different laser irradiation conditions in the irradiation region 20 on the display unit 34 in mutually different display modes. FIG. 10 shows a display example in which the different irradiation conditions are set for the partial regions 20a and 20b having relatively wide areas, the partial regions 20c and 20d having middle areas, and the partial regions 20e and 20f having relatively narrow areas. As shown in FIG. 10, when the different irradiation conditions are set for the partial regions 20a and 20b, the partial regions 20c and 20d, and the partial regions 20e and 20f, the display control unit 311 displays the partial regions 20a and 20b, the partial regions 20c and 20d, and the partial regions 20e and 20f in different colors on the display unit 34. The display control unit 311 displays, for example, the insides of the partial regions 20a and 20b in red, displays the insides of the partial regions 20c and 20d in blue, and displays the insides of the partial regions 20e and 20f in gray. In FIG. 10, in order to be easily understood, the color differences of the regions are expressed by the pattern differences of the regions.

In this manner, the display control unit 311 displays the regions having the different irradiation conditions in different colors. In other words, the display control unit 311 displays a preview of a plurality of mutually different irradiation conditions in mutually different display modes on the display unit 34. This makes the user easily confirm the difference in the irradiation conditions between the partial regions 20a to 20f.

More specifically, the display control unit 311 displays, on the display unit 34, a preview of the plurality of partial regions 20a to 20f having the mutually different irradiation conditions in mutually different display modes although the plurality of partial regions 20a to 20f are to be expanded to the same height with laser irradiation. Specifically, when the input receiving unit 33 has received, from the user, input of the mutually different irradiation conditions for at least two partial regions among the plurality of partial regions 20a to 20f, the display control unit 311 displays the at least two partial regions by changing the inside colors of the regions to mutually different colors as shown in FIG. 10, for example. On the other hand, the input receiving unit 33 has not received input of the irradiation conditions from the user, the setting unit 312 sets the mutually different irradiation conditions for at least two partial regions among the plurality of partial regions 20a to 20f having different areas or widths. Thus, the display control unit 311 also displays the at least two partial regions in different display modes in this case.

In this manner, the display control unit 311 displays a preview of partial regions having mutually different laser irradiation conditions in mutually different display modes on a preview screen before expanding processing is performed, regardless of the heights of the partial regions 20a to 20f after expansion. This makes the user easily confirm the differences between the laser irradiation conditions as well as the heights of the partial regions 20a to 20f. If the laser irradiation conditions are different, differences in expansion occur although the partial regions 20a to 20f are to expand to the same height. The display control unit 311 can simply notify the user of the differences in expansion due to the differences in the laser irradiation conditions, in the information on the two-dimensional plane that is the display screen of the display unit 34.

Returning to FIG. 7, the output unit 313 generates irradiation data in which the irradiation conditions set by the setting unit 312 are associated with the respective partial regions 20a to 20f in the irradiation region 20, and outputs the generated irradiation data to the expanding apparatus 50. The output unit 313 functions as a laser control unit (laser control section) that controls the output (the output intensity and the condensing degree) and the scanning speed of a laser beam in the expanding apparatus 50 in accordance with the irradiation conditions set by the setting unit 312.

Specifically, when the setting unit 312 has set the irradiation conditions for the respective partial regions 20a to 20f in the irradiation region 20, the output unit 313 generates irradiation data associated with the respective partial regions 20a to 20f. Then, the output unit 313 communicates with the expanding apparatus 50 via the communication unit 36, and transmits the generated irradiation data to the expanding apparatus 50 together with a control command. The output unit 313 thereby causes the expanding apparatus 50 to irradiate the thermally expandable sheet 10 with a laser beam in accordance with the transmitted irradiation data. In other words, the output unit 313 controls the motion of the expanding apparatus 50 so that laser irradiation is performed in the expanding apparatus 50 at the output and the scanning speed corresponding to the irradiation conditions set by the setting unit 312. The output unit 313 is implemented by the control unit 31 cooperating with the communication unit 36.

The output unit 313 further outputs, to the printing apparatus 40, print data for coloring the shaped object 2 to be shaped. The print data is data indicating a color image to be printed on the surface of the thermally expandable sheet 10. The output unit 313 communicates with the printing apparatus 40 via the communication unit 36 and transmits, to the printing apparatus 40, the print data corresponding to the irradiation data output to the expanding apparatus 50.

<Processing Flow of Shaping System 1>

A processing flow for producing a shaped object to be performed in the shaping system 1 configured as described above is described with reference to a sequence diagram shown in FIG. 11.

Figure 11:
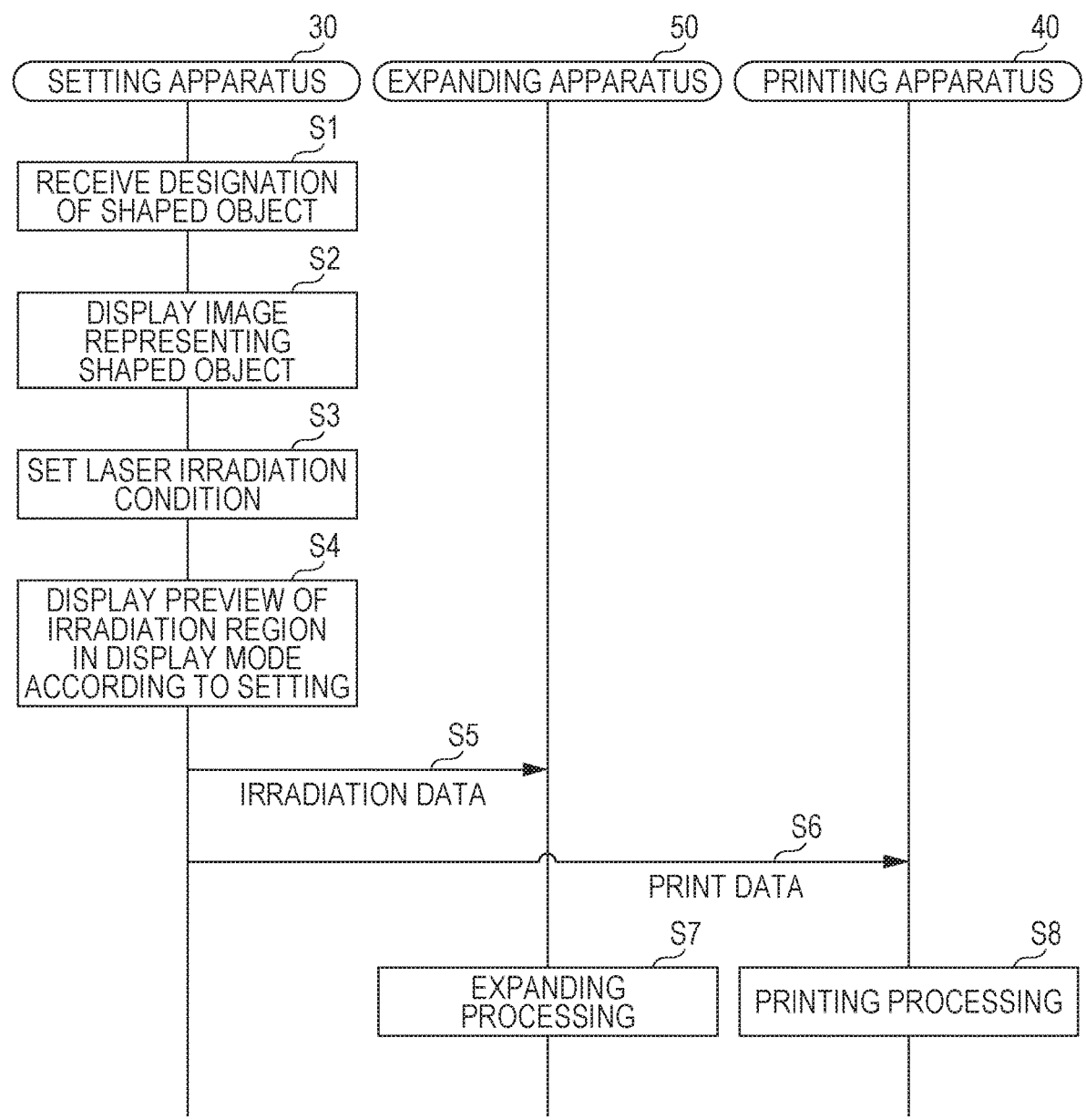
FIG. 11 is a sequence diagram showing a procedure of processing for producing a shaped object performed by the shaping system according to the first embodiment.

In the processing shown in FIG. 11, the control unit 31 of the setting apparatus 30, first, receives designation of a shaped object (step S1). The user can operate the input receiving unit 33 to designate a desired shaped object from among a plurality of shaped objects that can be shaped by the shaping system 1. The control unit 31 receives the designation input from the user via the input receiving unit 33.

When receiving the designation of the shaped object, the control unit 31 functions as the display control unit 311 and displays, on the display unit 34, an image representing the shaped object the designation of which has been received (step S2). For example, when the designation of the shaped object 2 shown in FIG. 3 is received, the control unit 31 displays, on the display unit 34, the image representing the irradiation region 20 for shaping the shaped object 2 as shown in FIG. 8.

When displaying the image representing the shaped object, the control unit 31 sets laser irradiation conditions (step S3). Specifically, the user operates the input receiving unit 33 while viewing the display screen shown in, for example, FIG. 9 to select the respective partial regions 20a to 20f included in the irradiation region 20. Then, the user sets at least one of the output intensity and the condensing degree of a laser beam with which the respective partial regions 20a to 20f are to be irradiated by the expanding apparatus 50, and the movement speed of the laser irradiation unit 60. The control unit 31 sets the laser irradiation conditions for the respective partial regions 20a to 20f in accordance with the setting input received from the user.

When having set the laser irradiation conditions, the control unit 31 functions as the display control unit 311 and displays, on the display unit 34, a preview of the partial regions 20a to 20f in display modes according to the settings (step S4). Specifically, the control unit 31 displays regions having different laser irradiation conditions set in step S3 among the plurality of partial regions 20a to 20f in different colors as shown in, for example, FIG. 10.

When receiving a shaping start instruction from the user after displaying the respective partial regions 20a to 20f as described above, the control unit 31 functions as the output unit 313 and outputs irradiation data to the expanding apparatus 50 (step S5). When the user confirms the respective partial regions 20a to 20f displayed on the display unit 34 and desires to start shaping, the user operates the input receiving unit 33 to input the shaping start instruction. When the shaping start instruction is input, the control unit 31 generates irradiation data in which the irradiation conditions set in step S3 are associated with the respective partial regions 20a to 20f, and transmits the generated irradiation data to the expanding apparatus 50 via the communication unit 36. When the irradiation data is transmitted from the setting apparatus 30, the control unit 70 of the expanding apparatus 50 receives the transmitted irradiation data.

Note that, when the shaping start instruction is not received, the control unit 31 repeats the processing from steps S3 to S4 as appropriate. In other words, until receiving the shaping start instruction, the control unit 31 repeats the processing for setting the laser irradiation conditions and the processing for updating the display modes for the respective partial regions 20a to 20f in accordance with the settings of the irradiation conditions.

The control unit 31 further outputs print data corresponding to the designated shaped object to the printing apparatus 40 (step S6). Specifically, the control unit 31 transmits print data indicating a color image for coloring the shaped object instructed to start shaping to the printing apparatus 40 via the communication unit 36. When the print data is transmitted from the setting apparatus 30, the printing apparatus 40 receives the transmitted irradiation data.

When receiving the irradiation data, the control unit 70 of the expanding apparatus 50 performs expanding processing for expanding the thermally expandable sheet 10 in accordance with the received irradiation data (step S7). In order to perform the expanding processing, the user prepares the thermally expandable sheet 10 before the shaped object is shaped, and inserts the sheet into the expanding apparatus 50 with the surface facing upward. The expanding apparatus 50 heats and expands the thermally expandable sheet 10 by irradiating the surface of the inserted thermally expandable sheet 10 with a laser beam.

Figure 12:
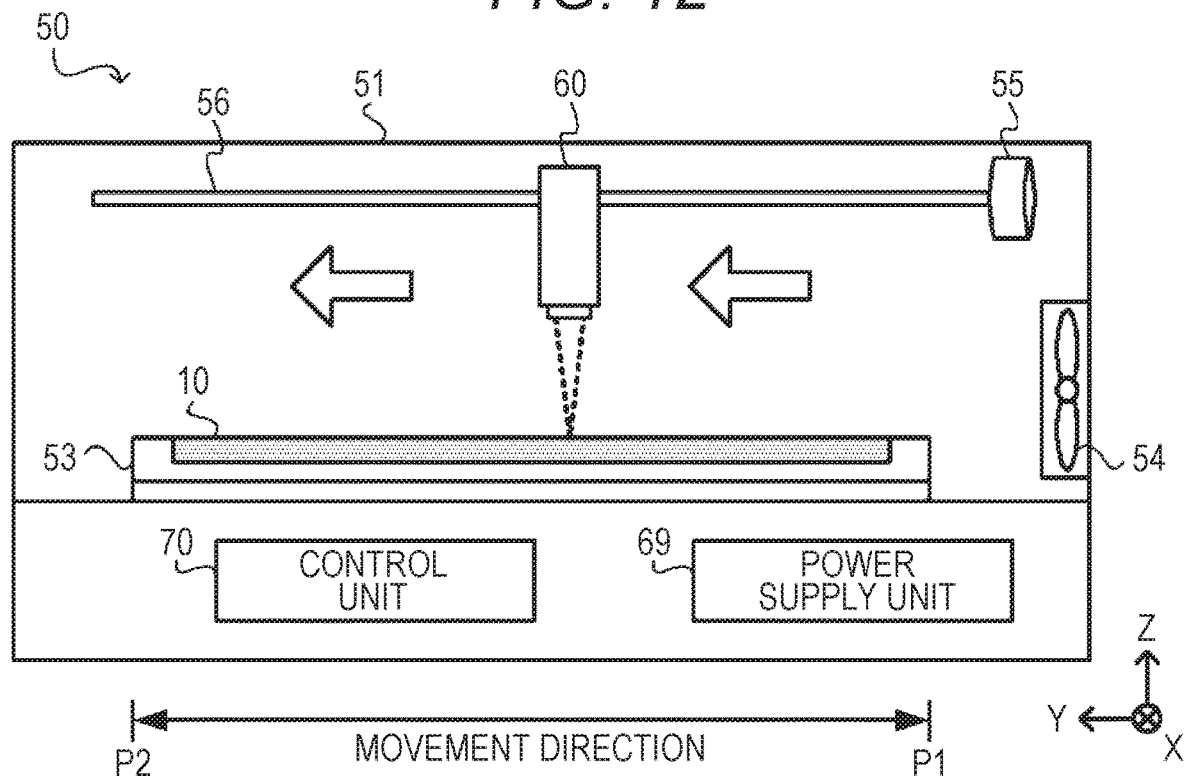
FIG. 12 is a diagram showing that expanding processing of a thermally expandable sheet is being performed by the expanding apparatus according to the first embodiment.

Specifically, the control unit 70 of the expanding apparatus 50 supplies a power supply voltage to the laser irradiation unit 60 to turn on a laser beam. Then, as shown in FIG. 12, the control unit 70 drives the conveyance motor 55 to move the laser irradiation unit 60 along the surface of the thermally expandable sheet 10. The control unit 70 thereby irradiates the respective partial regions 20a to 20f in the irradiation region 20 indicated by the irradiation data received from the setting apparatus 30 with the laser beam under the irradiation conditions indicated by the irradiation data. More specifically, the control unit 70 moves, at a speed indicated by the irradiation data, the laser irradiation unit 60 emitting the laser beam with the output intensity and the spot diameter indicated by the irradiation data.

Figure 13:
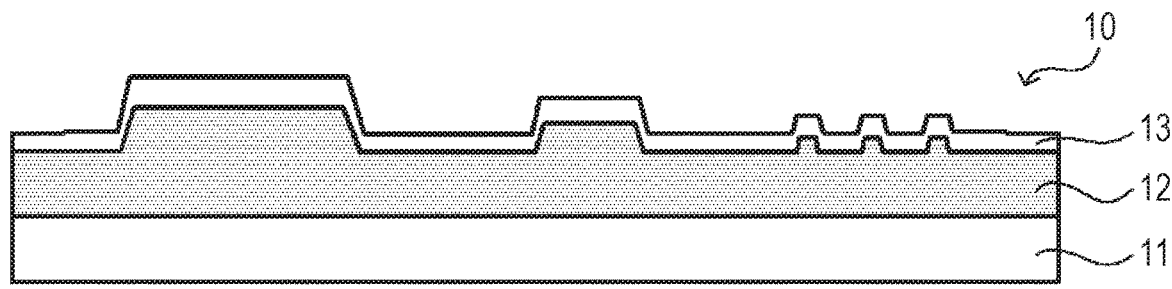
FIG. 13 is a diagram showing an example in which the thermally expandable sheet is expanded by the shaping system according to the first embodiment.

When the laser irradiation unit 60 emits the laser beam, the irradiation region 20 of the thermally expandable sheet 10 irradiated with the laser beam generates heat, and expands when heated to a predetermined temperature or higher. The predetermined temperature is a temperature at which the thermal expansion agent contained in the thermally expandable layer 12 starts to expand, and is, for example, about 80° C. to 120° C. When heated to the predetermined temperature or higher, the thermally expandable sheet 10 expands to a height corresponding to the amount of generated heat. As a result, the portion of the thermally expandable sheet 10 irradiated with the laser protrudes and expands, as shown in, for example, FIG. 13.

Figure 14:
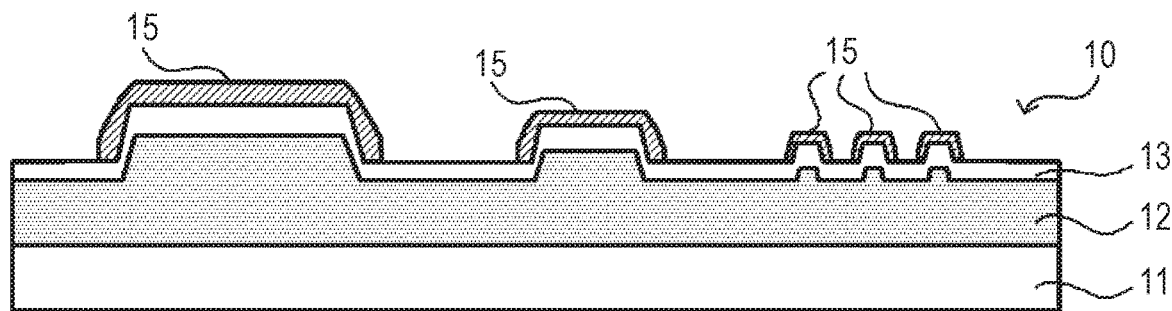
FIG. 14 is a diagram showing an example in which a color ink layer is printed on the thermally expandable sheet by the shaping system according to the first embodiment.

Returning to FIG. 11, when receiving the print data from the setting apparatus 30, the printing apparatus 40 performs printing processing for printing a color image on the thermally expandable sheet 10 in accordance with the received print data (step S8). The user inserts the thermally expandable sheet 10 whose surface has been bumped in the expanding processing into the printing apparatus 40 with the surface facing upward. The printing apparatus 40 prints a color image on the surface of the inserted thermally expandable sheet 10. Specifically, the printing apparatus 40 ejects ink of at least one of cyan C, magenta M, and yellow Y onto the surface of the thermally expandable sheet 10 in accordance with the print data received from the setting apparatus 30. As the result, a color ink layer 15 is formed on the ink receiving layer 13 of the thermally expandable sheet 10 as shown in FIG. 14. With the above steps, the producing processing for the shaped object shown in FIG. 11 is completed.

As described above, by expanding the portions of the thermally expandable sheet 10 irradiated with a laser beam and printing a color image, a color shaped object is shaped in the thermally expandable sheet 10. By adjusting the degree of heating with a laser beam according to the height of the target bump, it is possible to obtain shaped objects having various shapes including the shaped object 2 shown in FIG. 3.

Note that, the printing processing (step S8) of the printing apparatus 40 is not limited to being performed after the expanding processing (step S7) of the expanding apparatus 50, and may be performed before the expanding processing. In other words, the thermally expandable sheet 10 may be expanded with laser irradiation after the color ink layer 15 is printed on the surface of the thermally expandable sheet 10. If a monochrome shaped object is produced, the printing apparatus 40 may print a monochrome image instead of a color image in step S8. In this case, a black ink layer instead of the color ink layer 15 is formed on the ink receiving layer 13.

As described above, the shaping system 1 according to the first embodiment expands the thermally expandable sheet 10 to produce the shaped object 2 by irradiating the thermally expandable sheet 10 with a laser beam and locally heating the surface. At that time, the setting apparatus 30 displays the irradiation region 20 on the thermally expandable sheet 10 to be irradiated with the laser beam, and sets the laser irradiation conditions for the respective partial regions 20a to 20f in the irradiation region 20 in accordance with the input received from the user. Accordingly, it is possible for the user to easily set various irradiation conditions, such as the output intensity and the condensing degree of the laser beam, and the movement speed, for the respective partial regions 20a to 20f while confirming the sizes and shapes of the respective partial regions 20a to 20f included in the irradiation region 20 on the thermally expandable sheet 10.

The setting apparatus 30 further displays the irradiation region 20 on the thermally expandable sheet 10 to be irradiated with the laser beam, and displays a preview of the plurality of partial regions 20a to 20f having mutually different laser irradiation conditions in the irradiation region 20 in mutually different display modes. Accordingly, it is possible for the user to easily confirm the laser irradiation conditions set for the respective partial regions 20a to 20f on the thermally expandable sheet 10, and to appropriately reset irradiation conditions for the respective partial regions 20a to 20f, if necessary. Furthermore, since the difference in the laser irradiation conditions between the partial regions 20a to 20f can be confirmed, it is possible for the user to predict the state of the thermally expandable sheet 10 after the expansion in consideration of the influence of the difference in the irradiation conditions.

As described above, the user can easily set and confirm the irradiation conditions of a laser beam with which the thermally expandable sheet 10 is to be irradiated, and it is thereby possible to easily set the irradiation conditions for regions on the thermally expandable sheet 10 to be irradiated with the laser beam in order to accurately expand to desired heights regardless of the sizes and shapes. As the result, it becomes easy to appropriately produce the desired shaped object 2 in the thermally expandable sheet 10.

Second Embodiment

Next, a second embodiment of the present invention is described. The description of a similar configuration to that in the first embodiment is omitted.

In the first embodiment, the display control unit 311 displays, on the display unit 34, at least two partial regions having different laser irradiation conditions among the plurality of partial regions 20a to 20f in different colors. In contrast, in the second embodiment, the display control unit 311 displays, in mutually different styles according to laser irradiation conditions, a plurality of lines inside at least two partial regions having different laser irradiation conditions among the plurality of partial regions 20a to 20f.

Figure 15:
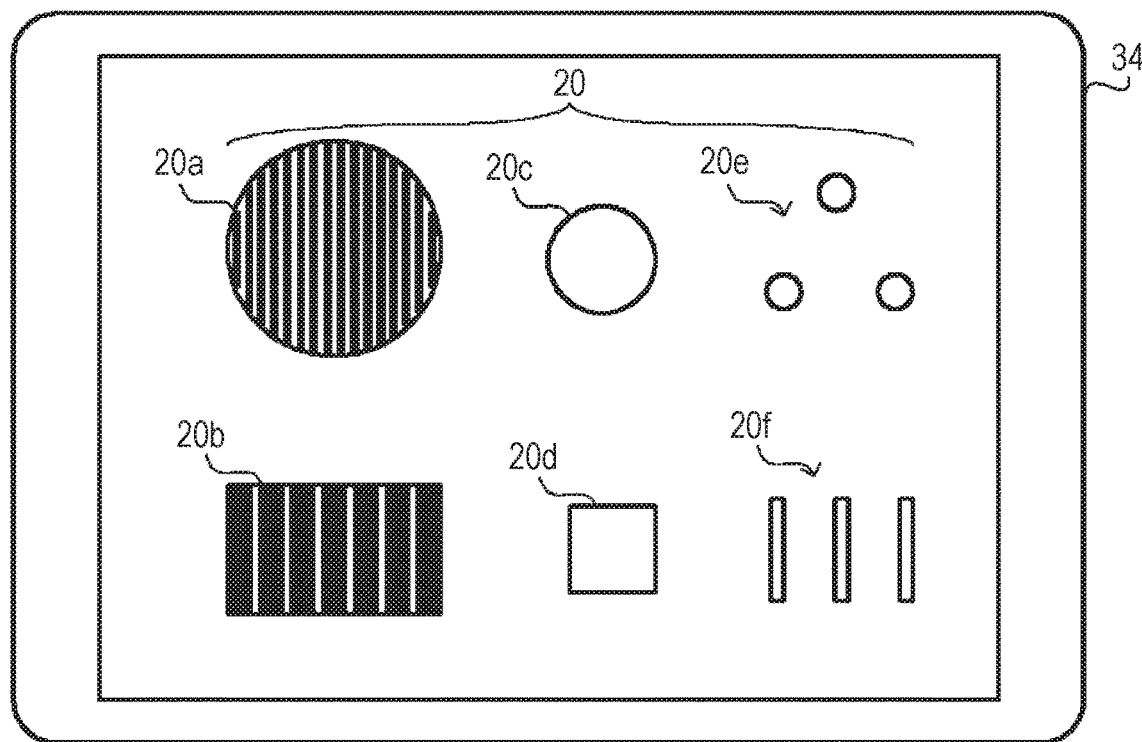
FIG. 15 is a diagram showing an example of an irradiation region displayed in a display mode according to a laser irradiation condition in a second embodiment.

FIG. 15 shows a display example of the partial regions 20a and 20b on the display unit 34 in the second embodiment. FIG. 15 shows that no irradiation condition for the partial regions 20c to 20f is set in order to be easily understood.

As shown in FIG. 15, the display control unit 311 displays a plurality of lines inside the partial regions 20a and 20b displayed on the display unit 34 according to the laser irradiation conditions set for the partial regions 20a and 20b. Here, the lines are straight lines parallel to each other. That is, by displaying a plurality of parallel lines, striped patterns are displayed inside the partial regions 20a and 20b.

At this time, the display control unit 311 displays patterns of a plurality of lines inside the partial regions 20a and 20b along the scanning direction of a laser beam in which the thermally expandable sheet 10 is to be irradiated when the partial regions 20a and 20b are irradiated with the laser beam. Specifically, the expanding apparatus 50 performs scanning with the laser irradiation unit 60 in the irradiation direction, which is the X direction, while gradually moving the laser irradiation unit 60 in the Y direction in FIG. 5 to irradiate the partial regions 20a to 20f on the thermally expandable sheet 10 with the laser beam. In this case, as shown in FIG. 15, the display control unit 311 displays, inside the partial regions 20a and 20b, a plurality of lines extending in the direction corresponding to the X direction in the expanding apparatus 50, that is, the longitudinal direction of the display unit 34. This represents the pseudo tracks of the laser beam with which the partial regions 20a and 20b are to be irradiated.

The display control unit 311 further displays the line width of a plurality of lines at a portion at which the laser condensing degree is larger when the laser irradiation is performed among the partial regions 20a and 20b so as to be thinner. As an example, if the partial region 20a is set with a larger condensing degree than the partial region 20b, the display control unit 311 displays a plurality of lines having a relatively thin line width as the pattern inside the partial region 20a set with the relatively larger condensing degree, and displays a plurality of lines having a relatively thick line width as the pattern inside the partial region 20b set with a relatively smaller condensing degree, as shown in FIG. 15.

Generally, the laser spot diameter becomes small as the laser condensing degree is large, and the width of the region to be irradiated per one scan of a laser beam narrows. For this reason, although regions on the thermally expandable sheet 10 have the same area, a large number of thin regions are sequentially individually expanded if the laser condensing degree is large, and a wide region is expanded at a time if the laser condensing degree is small. As the result, differences in appearance and texture after expansion is generated depending on the magnitude of the laser condensing degree. In contrast, the display control unit 311 simulates the state after expansion by expressing the differences in the laser condensing degree with the line thicknesses of the patterns inside the regions as shown in FIG. 15.

As described above, the setting apparatus 30 according to the second embodiment displays, inside the partial regions 20a and 20b displayed on the display unit 34, patterns of a plurality of parallel lines according to the laser irradiation conditions. The setting apparatus 30 thereby displays the states of the partial regions 20a and 20b after expansion in a more simulated manner in the information on the two-dimensional plane that is the display screen of the display unit 34. As the result, it is possible for the user to grasp in advance the state of the thermally expandable sheet 10 after expansion.

Note that, the line widths of the plurality of lines displayed inside the partial regions 20a and 20b may or may not match the actual laser spot diameters. Although the line widths do not match the spot diameters, the relative difference in the states of the partial regions 20a 20b after expansion due to the difference in the spot diameters can be expressed.

Third Embodiment

Next, a third embodiment of the present invention is described. The description of a similar configuration to that in the first and second embodiments is omitted.

In the first embodiment, the input receiving unit 33 receives input of the laser irradiation condition for the irradiation region 20, and the setting unit 312 sets, according to the operation input received by the input receiving unit 33, laser irradiation conditions for the respective partial regions 20a to 20f in the irradiation region 20. In contrast, in the third embodiment, the input receiving unit 33 receives input of a surface state of the thermally expandable sheet 10 after expansion from the user, and the setting unit 312 sets, according to the input of the surface state received by the input receiving unit 33, laser irradiation conditions.

Here, the surface state of the thermally expandable sheet 10 after expansion is a state of the surface of the thermally expandable sheet 10 after the thermally expandable sheet 10 is expanded by being irradiated with a laser beam, and can also be referred to as the finished state of the thermally expandable sheet 10 after expansion. Specifically, the input receiving unit 33 receives input of the expansion height and the surface roughness as the surface state. The expansion height is the height of the bump of the thermally expandable sheet 10 after expansion. The surface roughness is a degree to which the surface of the thermally expandable sheet 10 after expansion is rough or smooth.

Figure 16:
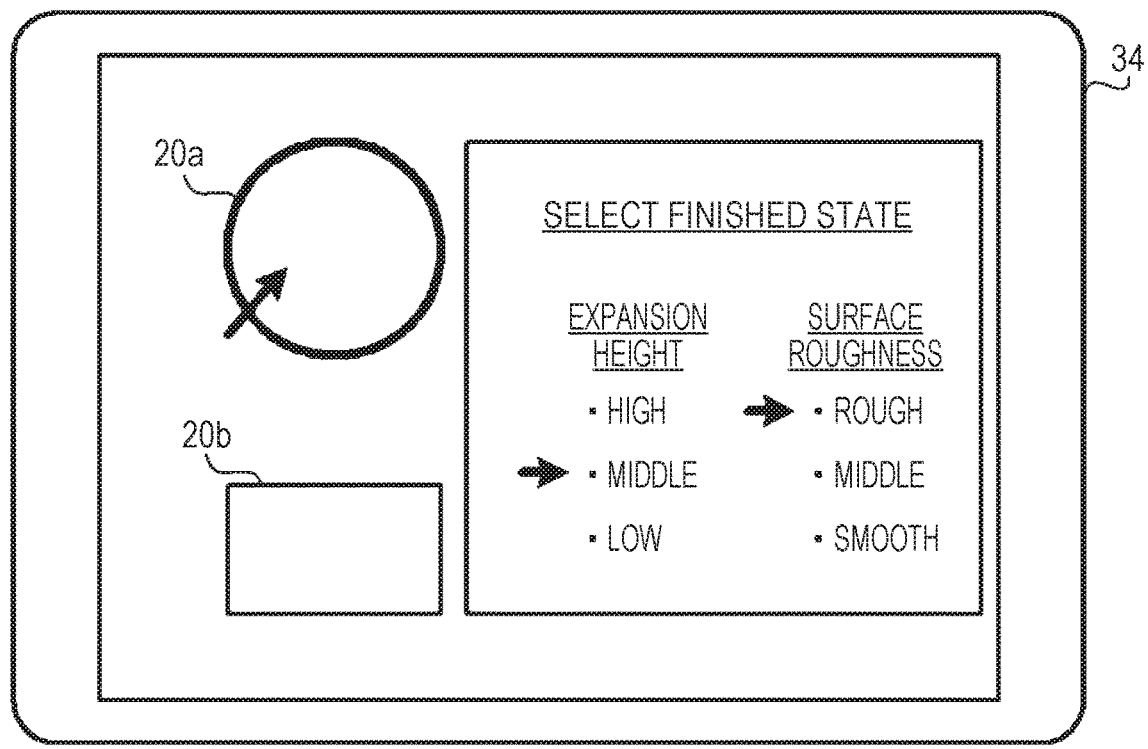
FIG. 16 is a diagram showing an example of a setting screen for a surface state of a thermally expandable sheet after expansion in a third embodiment of the present invention.

FIG. 16 shows that the surface state of the thermally expandable sheet 10 after expansion is being input for the partial region 20a in the irradiation region 20 displayed on the display unit 34 in the third embodiment. As shown in FIG. 16, the user operates the input receiving unit 33 to select the partial region 20a as a target for setting the surface state. The display control unit 311 displays a setting screen for selecting and setting the finished state that is the surface state of the selected partial region 20a after expansion, that is specifically, the expansion height and the surface roughness. The user sets the surface states for the respective partial regions 20a to 20f by selecting a desired surface state from among a plurality of surface states displayed on the setting screen.

Specifically, in the example of FIG. 16, the display control unit 311 displays three options of "high", "medium", and "low" as the expansion height, and three options of "rough", "medium", and "smooth" as the surface roughness. The user can select the expansion height from among the displayed three options. The user can further select the surface roughness from among the displayed three options. When the expansion height or surface roughness is selected by the user, the setting unit 312 sets the laser irradiation condition according to the selected expansion height or surface roughness.

Note that, the setting unit 312 may not set the surface state from among a plurality of options as shown in FIG. 16. For example, the input receiving unit 33 may receive input of a certain numerical value of the expansion height or surface roughness of the thermally expandable sheet 10 after expansion from the user, and the setting unit 312 may set the irradiation condition according to the numerical value of the expansion height or surface roughness received by the input receiving unit 33.

Alternatively, the display control unit 311 may display a preview of a plurality of images (thumbnails or the like) representing a plurality of mutually different surface states of the thermally expandable sheet 10 after expansion on the display unit 34. In this case, the input receiving unit 33 receives input for selecting any one of the plurality of displayed images from the user, and the setting unit 312 sets the irradiation condition according to the surface state corresponding to the selected image.

As described above, the setting unit 312 is configured so that the surface state of the thermally expandable sheet 10 after expansion is selectable from among a plurality of mutually different surface states. The setting unit 312 sets the laser irradiation conditions for the respective partial regions 20a to 20f according to the surface states selected from among a plurality of surface states by the user operation.

More specifically, the setting unit 312 sets the irradiation conditions for the respective partial regions 20a to 20f, based on the surface states selected for the respective partial regions 20a to 20f by the user operation, and the areas or widths of the respective partial regions 20a to 20f.

First, the setting unit 312 sets the laser irradiation condition according to the expansion height selected by the user operation. More specifically, as the expansion height is higher, the required amount of heating is larger. Thus, the setting unit 312 sets the irradiation condition for a portion at which the expansion height selected by the user operation is relatively high so that the output intensity is increased, the condensing degree is increased, or the movement speed is lowered, compared to a portion of the thermally expandable sheet 10 at which the expansion height is relatively low.

Secondly, the setting unit 312 sets the laser condensing degree according to the surface roughness selected by the user operation. Specifically, if the laser condensing degree is relatively small, the spot diameter of the laser beam on the surface of the thermally expandable sheet 10 becomes large, and the area of the region to be expanded with one laser scanning is increased. As the result, the degree of surface roughness of the thermally expandable sheet 10 after expansion becomes large. That is, the surface of the thermally expandable sheet 10 after expansion becomes rough. In contrast, if the laser condensing degree is relatively large, the laser spot diameter on the surface of the thermally expandable sheet 10 becomes small, and the degree of surface roughness of the thermally expandable sheet 10 after expansion becomes small. Thus, when the surface roughness selected by the user operation is rougher, the setting unit 312 sets the laser condensing degree so as to be smaller. On the other hand, when the surface roughness selected by the user operation is smoother, the setting unit 312 sets the laser condensing degree so as to be larger.

As described above, the setting unit 312 sets, according to the surface state (the expansion height or the surface roughness) selected from among a plurality of surface states by the user operation, the laser irradiation conditions for the respective partial regions 20a to 20f so that the surface states of the thermally expandable sheet 10 after expansion match the selected surface states. The setting unit 312 further sets the laser irradiation conditions according to the areas or widths of the respective partial regions 20a to 20f.

Specifically, when at least two partial regions among the plurality of partial regions 20a to 20f have the same area and width, and when the surface states selected for the at least two partial regions by the user operation are the same, the setting unit 312 sets the same irradiation conditions for the at least two partial regions. Meanwhile, when at least two partial regions among the plurality of partial regions 20a to 20f have different areas or widths, the setting unit 312 sets mutually different irradiation conditions for the at least two partial regions although the surface states selected for the at least two partial regions by the user operation are the same.

The processing for setting the irradiation conditions according to the areas or widths of the partial regions 20a to 20f is similar to that in the first embodiment. Specifically, if the selected surface states are the same, the setting unit 312 sets at least one of the laser output intensity, the laser condensing degree, and the movement speed of the laser irradiation unit 60 for each of the partial regions 20a to 20f so as to be smaller when the area or width is wider. The setting unit 312 thereby enhances the heat storage property of the regions to be irradiated with a laser beam to expand the entire regions as evenly as possible. On the other hand, if the selected surface states are the same, the setting unit 312 sets at least one of the laser output intensity, the laser condensing degree, and the movement speed of the laser irradiation unit 60 for each of the partial regions 20a to 20f so as to be larger when the area or width is narrower. The setting unit 312 thereby locally intensively heats the regions to be irradiated with a laser beam in a short time to be sharply expanded.

In the setting apparatus 30, the display control unit 311 displays, on the display unit 34, a preview of the plurality of partial regions 20a to 20f having mutually different irradiation conditions set by the setting unit 312 in the irradiation region 20 in mutually different display modes. The output unit 313 generates irradiation data in which the irradiation conditions set by the setting unit 312 are associated with the respective partial regions 20a to 20f in the irradiation region 20, and outputs the generated irradiation data to the expanding apparatus 50. The output unit 313 thereby controls the motion of the expanding apparatus 50 so that laser irradiation is performed in the expanding apparatus 50 at the output and the scanning speed corresponding to the irradiation conditions set by the setting unit 312. Since the functions of the display control unit 311 and the output unit 313 are similar to those in the first or second embodiment, detailed description thereof is omitted.

As described above, the setting apparatus 30 according to the third embodiment receives input for selecting the surface state of the thermally expandable sheet 10 after expansion, and sets the laser irradiation condition according to the selected surface state. Since the laser irradiation conditions is set based on the surface state after expansion selected by the user, it is possible to more surely expand the thermally expandable sheet 10 so as to be in a finished state desired by the user compared with the laser irradiation conditions directly set by the user as in the first embodiment.

Modification

The embodiments of the present invention have been described above, but the above embodiments are merely examples, and the scope of application of the present invention is not limited thereto. That is, the embodiments of the present invention are applicable in various ways, and any embodiment is included in the scope of the present invention.

For example, in the above embodiments, the expanding apparatus 50 has included the conveyance motor 55 as a movement section for moving the laser irradiation unit 60, and expanded the thermally expandable sheet 10 by irradiating the fixed thermally expandable sheet 10 with a laser beam while moving the laser irradiation unit 60. However, the expanding apparatus 50 includes a conveyance mechanism that conveys the thermally expandable sheet 10, and may expand the thermally expandable sheet 10 by irradiating the thermally expandable sheet 10 being conveyed with an electromagnetic wave from the fixed laser irradiation unit 60.

Figure 17:
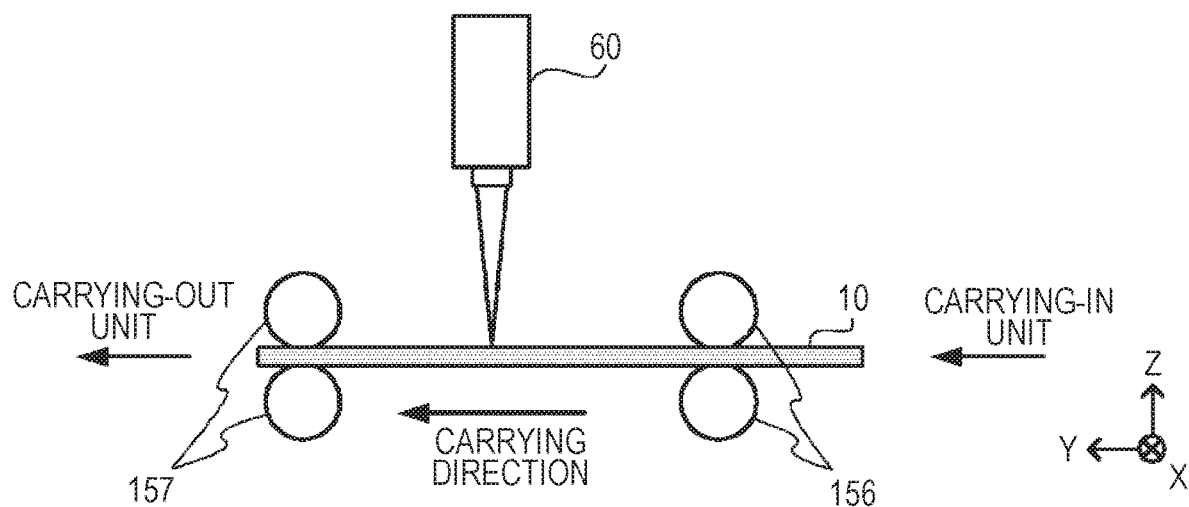
FIG. 17 is a diagram showing a configuration of a laser irradiation unit and its surroundings of an expanding apparatus according to a modification of the present invention.

In order to convey the thermally expandable sheet 10, the expanding apparatus 50 includes a pair of conveyance rollers 156 and 157 as shown in FIG. 17. The pair of conveyance rollers 156 and 157 is rotated by a driving force of a conveyance motor (not shown), sandwiches the thermally expandable sheet 10 carried into the expanding apparatus 50 from a carrying-in unit, and conveys the sheet in the Y direction. The thermally expandable sheet 10 is irradiated with a laser beam emitted from the laser irradiation unit 60 installed at a fixed position while being conveyed by the pair of conveyance rollers 156 and 157.

More specifically, the pair of conveyance rollers 156 and 157 conveys the thermally expandable sheet 10 at a movement speed indicated by the irradiation data received from the setting apparatus 30. In this situation, the control unit 70 performs scanning in the laser irradiation direction, that is, in the +X direction or the −X direction with a polygon mirror or the like (not shown) to irradiate the partial regions 20a to 20f in the irradiation region 20 on the thermally expandable sheet 10 with a laser beam. As the result, the portion of the thermally expandable sheet 10 irradiated with the laser beam is heated and expanded to form a shaped object. The thermally expandable sheet 10 in which the shaped object has been formed is carried out of the expanding apparatus 50 from a carrying-out unit. As long as the expanding apparatus 50 can relatively move the thermally expandable sheet 10 and the laser irradiation unit 60 in this manner, the expanding apparatus 50 may move either the thermally expandable sheet 10 or the laser irradiation unit 60.

In the above embodiments, the setting unit 312 has set the laser irradiation conditions for the respective partial regions 20a to 20f in the irradiation region 20 in accordance with the input received by the input receiving unit 33 from the user. However, in the present invention, the expanding apparatus 50 may not receive the input of the laser irradiation conditions from the user, and the setting unit 312 may set the laser irradiation conditions for all the plurality of partial regions 20a to 20f without depending on the input received from the user.

Specifically, when the shaped object 2 to be shaped is designated by the user, the setting unit 312 sets the laser irradiation conditions for the respective partial regions 20a to 20f in the irradiation region 20 indicated by the shaping data 321 for shaping the designated shaped object 2, based on the respective areas or widths of the plurality of partial regions 20a to 20f. For example, the setting unit 312 sets, for a partial region having a narrower area or width among the plurality of partial regions 20a to 20f, the laser output intensity or the light condensing degree so as to be smaller, and the relative movement speed between the thermally expandable sheet 10 and the laser irradiation unit 60 so as to be higher. When the irradiation condition is set by the setting unit 312, the display control unit 311 displays, on the display unit 34, a preview of the partial regions 20a to 20f for which mutually different irradiation conditions have been set in mutually different display modes as shown in FIG. 10. At this time, although at least two partial regions among the plurality of partial regions 20a to 20f are to be expanded to the same height, the setting unit 312 sets mutually different irradiation conditions for the at least two partial regions. Then, the display control unit 311 displays, on the display unit 34, a preview of the at least two partial regions for which the mutually different irradiation conditions have been set by the setting unit 312 in mutually different display modes. The user can thereby easily confirm the laser irradiation conditions set for the respective partial regions 20a to 20f.

In the above embodiments, the display control unit 311 has displayed, on the display unit 34, at least two partial regions having different laser irradiation conditions among the plurality of partial regions 20a to 20f by changing the colors or line widths inside the regions. However, in the present invention, at least two partial regions having different laser irradiation conditions may be displayed in other display modes in addition to changing the colors or line widths inside the regions. For example, the display control unit 311 may display at least two partial regions having mutually different laser irradiation conditions on the display unit 34 by enclosing them with lines having mutually different thicknesses or with different types of lines (a solid line, a dotted line, a broken line, and the like). Alternatively, the display control unit 311 may display at least two partial regions having mutually different laser irradiation conditions on the display unit 34 with mutually different brightness.

In the above embodiments, the thermally expandable sheet 10 has included the base material 11, the thermally expandable layer 12, and the ink receiving layer 13. However, in the present invention, the configuration of the thermally expandable sheet 10 is not limited to this. For example, the thermally expandable sheet 10 may not include the ink receiving layer 13 or may include a peelable layer that can be peeled off on the front surface or the back surface. Alternatively, the thermally expandable sheet 10 may include a layer made of any other material.

In the above embodiments, the setting apparatus 30, the printing apparatus 40, and the expanding apparatus 50 have been independent apparatuses. However, in the present invention, at least any two of the setting apparatus 30, the printing apparatus 40, and the expanding apparatus 50 may be integrated. For example, the function of the setting apparatus 30 may be incorporated as a part of the expanding apparatus 50.

In the above embodiments, the control unit 31 of the setting apparatus 30 has included a CPU and functioned as the display control unit 311, the setting unit 312, and the output unit 313 with the functions of the CPU. However, in the setting apparatus 30 according to the present invention, the control unit 31 may include, instead of the CPU, dedicated hardware, such as an application specific integrated circuit (ASIC), a field-programmable gate array (FPGA), or various control circuits, and may function as the display control unit 311, the setting unit 312, and the output unit 313. In this case, each processing may be performed by individual hardware, or all the processing may be collectively performed by single hardware. In addition, a part of the processing may be performed by dedicated hardware, and another part of the processing may be performed by software or firmware.

Note that, it is possible to provide the setting apparatus 30 having the configuration for implementing the functions according to the present invention, and to cause a computer to implement the functions of the setting apparatus 30 exemplified in the above embodiments by applying a program. That is, it is possible to apply a program for implementing the functional configuration of the setting apparatus 30 exemplified in the above embodiments so that a CPU or the like that controls an existing information processing apparatus or the like can execute the program.

The program can be applied by any method. The program can be stored in a computer-readable recording medium, such as a flexible disk, a CD-ROM, a DVD-ROM, and a memory card, and applied. Furthermore, the program can be applied via a communication medium, such as the Internet, by being superimposed on a carrier wave. For example, the program may be posted and distributed in a Bulletin Board System (BBS) on a communication network. Then, the program may be activated and executed in the similar manner to other application programs under the control of an OS (Operating System) to execute the above processing.

The preferred embodiments of the present invention have been described above, but the present invention is not limited to the specific embodiments, and includes the invention described in the claims and the equivalent scope thereof.

What is claimed is:

1. A setting apparatus comprising:
a control unit,
wherein:
the control unit is configured to:
set, by a user operation, an irradiation condition of a laser beam for a thermally expandable sheet, a surface of the thermally expandable sheet being heated and expanded by being irradiated with the laser beam; and
control an output and a scanning speed of the laser beam in accordance with the set irradiation condition, and
in the setting, (i) a surface state of the thermally expandable sheet after expansion is selectable from a plurality of mutually different surface states, and (ii) the irradiation condition is set by the user operation according to a surface state selected from among the plurality of surface states.

2. The setting apparatus according to claim 1, wherein the control unit sets at least one of an output intensity of the laser beam, a condensing degree of the laser beam, and the scanning speed of the laser beam as the irradiation condition.

3. The setting apparatus according to claim 1, wherein the control unit sets the irradiation condition based on the surface state selected by the user operation, and an area or a width of an irradiation region of the thermally expandable sheet to be irradiated with the laser beam.

4. The setting apparatus according to claim 3, wherein the control unit sets, when at least two portions in the irradiation region have different areas or widths, mutually different irradiation conditions for the at least two portions, even in a case in which the surface states which are selected for the at least two portions by the user operation are the same.

5. The setting apparatus according to claim 3, wherein the control unit sets, as the irradiation condition, at least one of an output intensity of the laser beam, a condensing degree of the laser beam, and the scanning speed of the laser beam to a smaller value when the area or the width of the irradiation region is wider.

6. The setting apparatus according to claim 1, wherein the surface state is an expansion height of the thermally expandable sheet, and
the control unit sets the irradiation condition according to the expansion height selected by the user operation.

7. The setting apparatus according to claim 1, wherein the surface state is a surface roughness of the thermally expandable sheet, and
the control unit sets a condensing degree of the laser beam according to the surface roughness selected by the user operation.

8. The setting apparatus according to claim 7, wherein the control unit sets the condensing degree of the laser beam so as to be smaller when the surface roughness selected by the user operation is rougher.

9. A shaping system comprising:
the setting apparatus according to claim 1; and
an expanding apparatus configured to expand the thermally expandable sheet, wherein
the expanding apparatus comprises a laser irradiation section configured to irradiate the thermally expandable sheet with the laser beam under the irradiation condition set by the setting apparatus.

10. A method for setting a setting apparatus configured to control an expanding apparatus including a laser, the method comprising:
a setting step of setting, by a user operation, an irradiation condition of a laser beam for a thermally expandable sheet, a surface of the thermally expandable sheet being heated and expanded by being irradiated with the laser beam; and
a controlling step of controlling an output and a scanning speed of the laser beam in accordance with the irradiation condition set in the setting step, wherein
in the setting step, (i) a surface state of the thermally expandable sheet after expansion is selectable from a plurality of mutually different surface states, and (ii) the irradiation condition is set by the user operation according to a surface state selected from among the plurality of surface states.

11. The setting method according to claim 10, wherein the setting step includes setting at least one of an output intensity of the laser beam, a condensing degree of the laser beam, and the scanning speed of the laser beam as the irradiation condition.

12. The setting method according to claim 11, wherein the setting step includes setting the irradiation condition based on the surface state selected by the user operation, and an area or a width of an irradiation region of the thermally expandable sheet to be irradiated with the laser beam.

13. The setting method according to claim 12, wherein the setting step includes setting, when at least two portions in the irradiation region have different areas or widths, mutually different irradiation conditions for the at least two portions, even in a case in which the surface states which are selected for the at least two portions by the user operation are the same.

14. The setting method according to claim 12, wherein the setting step includes setting, as the irradiation condition, at least one of an output intensity of the laser beam, a condensing degree of the laser beam, and the scanning speed of the laser beam to a smaller value when the area or the width of the irradiation region is wider.

15. The setting method according to claim 10, wherein the surface state is an expansion height of the thermally expandable sheet, and the setting step includes setting the irradiation condition according to the expansion height selected by the user operation.

16. The setting method according to claim 10, wherein the surface state is a surface roughness of the thermally expandable sheet, and the setting step includes setting a condensing degree of the laser beam according to the surface roughness selected by the user operation.

17. A non-transitory computer-readable recording medium storing a program for controlling a setting apparatus including a control unit to execute processing comprising:
   setting processing for setting, by a user operation, an irradiation condition of a laser beam for a thermally expandable sheet, a surface of the thermally expandable sheet being heated and expanded by being irradiated with the laser beam; and
   laser controlling processing for controlling an output and a scanning speed of the laser beam in accordance with the irradiation condition set in the setting processing,
   wherein in the setting processing, (i) a surface state of the thermally expandable sheet after expansion is selectable from a plurality of mutually different surface states, and (ii) the irradiation condition is set, by the user operation, according to a surface state selected from among the plurality of surface states.

18. The non-transitory computer-readable recording medium according to claim 17, wherein the setting processing includes setting at least one of an output intensity of the laser beam, a condensing degree of the laser beam, and the scanning speed of the laser beam as the irradiation condition.

* * * * *